United States Patent
Wijesinghe et al.

(10) Patent No.: US 11,398,881 B2
(45) Date of Patent: *Jul. 26, 2022

(54) METHOD AND SYSTEM FOR CONFIGURING DEVICE-TO-DEVICE COMMUNICATION

(71) Applicant: NEC Corporation, Tokyo (JP)

(72) Inventors: Pushpika Wijesinghe, Victoria (AU); Phong Nguyen, Victoria (AU)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,508

(22) Filed: Jun. 16, 2020

(65) Prior Publication Data

US 2020/0313800 A1 Oct. 1, 2020

Related U.S. Application Data

(63) Continuation of application No. 16/199,696, filed on Nov. 26, 2018, now Pat. No. 10,735,144, which is a
(Continued)

(30) Foreign Application Priority Data

Apr. 29, 2014 (AU) .................................. 2014901540

(51) Int. Cl.
*H04L 5/00* (2006.01)
*H04L 1/16* (2006.01)
*H04W 72/04* (2009.01)
*H04W 76/14* (2018.01)
*H04W 40/16* (2009.01)
(Continued)

(52) U.S. Cl.
CPC .......... *H04L 1/1614* (2013.01); *H04L 5/0044* (2013.01); *H04W 40/16* (2013.01);
(Continued)

(58) Field of Classification Search
CPC ... H04L 1/1614; H04L 5/0044; H04L 5/0055; H04L 5/14; H04W 40/16; H04W 72/042;
(Continued)

(56) References Cited

U.S. PATENT DOCUMENTS 10,200,159 B2 * 2/2019 Wijesinghe ........... H04L 1/1664
10,735,144 B2 * 8/2020 Wijesinghe ........... H04W 76/14
(Continued)

FOREIGN PATENT DOCUMENTS

WO WO-2013/167748 A1 11/2013

OTHER PUBLICATIONS

International Search Report, Corresponding to PCT/JP2015/001402, dated Jun. 8, 2015, 2 pp.

*Primary Examiner* — Minh Trang T Nguyen

(57) ABSTRACT

A method and system for use in an advanced wireless communication network is provided. The method comprises: providing, to a group of UEs, a resource multiplexing configuration defining resource multiplexing for cellular and non-cellular communication; and allocating resources to the group of UEs for cellular communication, according to the resource multiplexing configuration. Advantageously, the method enables collisions and interference between D2D and cellular transmissions to be reduced or avoided.

16 Claims, 14 Drawing Sheets

Related U.S. Application Data continuation of application No. 15/303,635, filed as application No. PCT/JP2015/001402 on Mar. 13, 2015, now Pat. No. 10,200,159.

(51) Int. Cl.
*H04W 76/27* (2018.01)
*H04L 5/14* (2006.01)

(52) U.S. Cl.
CPC ..... *H04W 72/042* (2013.01); *H04W 72/0446* (2013.01); *H04W 76/14* (2018.02); *H04W 76/27* (2018.02); *H04L 5/0055* (2013.01); *H04L 5/14* (2013.01)

(58) Field of Classification Search
CPC .. H04W 72/0446; H04W 76/14; H04W 76/27
See application file for complete search history.

(56) References Cited

U.S. PATENT DOCUMENTS

| | | |
|---|---|---|
| 2013/0223318 A1 | 8/2013 | Liu et al. |
| 2013/0258996 A1 | 10/2013 | Jung et al. |
| 2013/0322413 A1 | 12/2013 | Pelletier et al. |
| 2014/0171073 A1 | 6/2014 | Kim et al. |
| 2015/0085719 A1 | 3/2015 | Yin et al. |

* cited by examiner

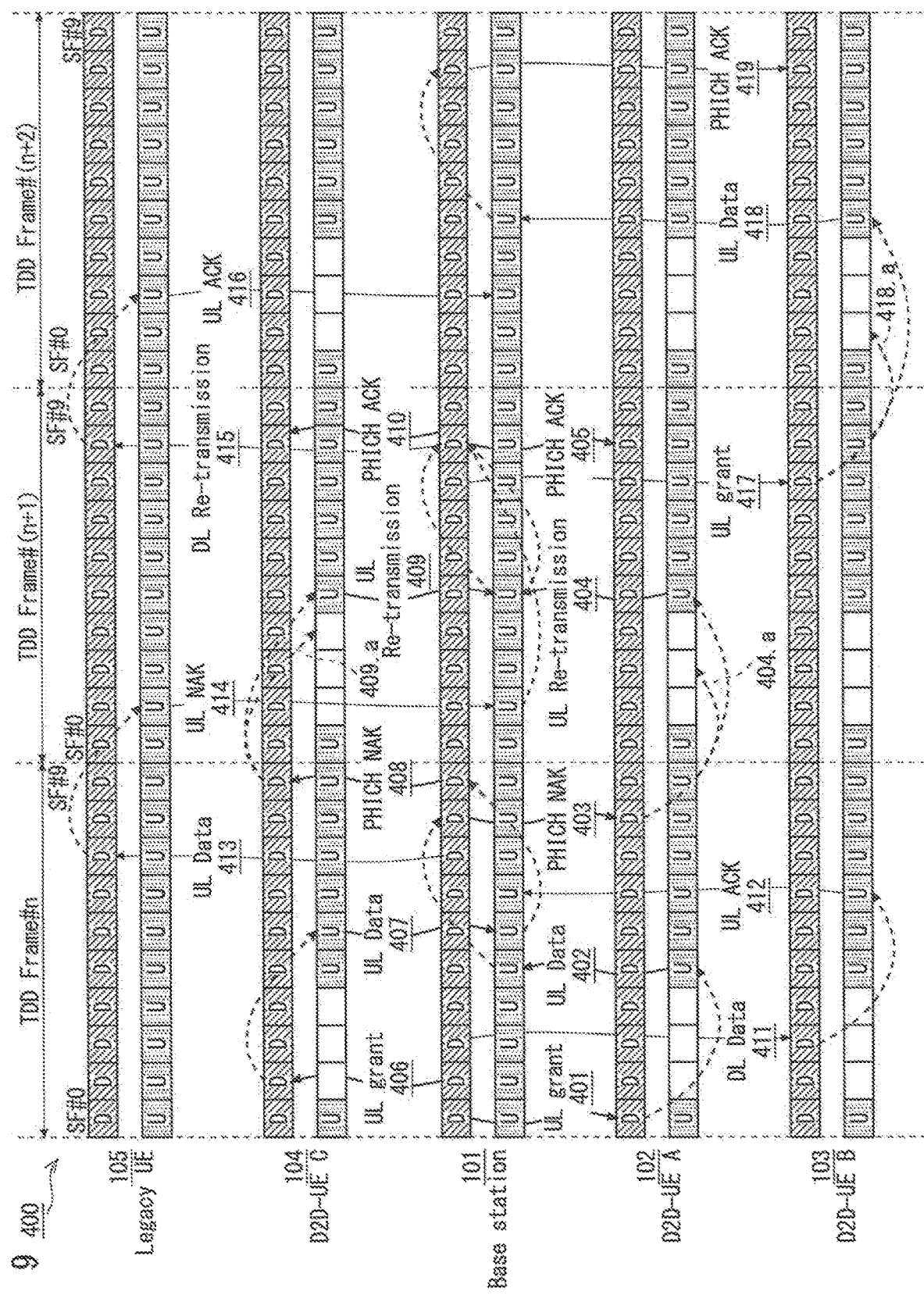

METHOD AND SYSTEM FOR CONFIGURING DEVICE-TO-DEVICE COMMUNICATION

RELATED APPLICATIONS

This application is a continuation of prior U.S. patent application Ser. No. 16/199,696, entitled "METHOD AND SYSTEM FOR CONFIGURING DEVICE-TO-DEVICE COMMUNICATION," filed Nov. 26, 2018, which is a continuation of prior U.S. patent application Ser. No. 15/303,635, entitled "METHOD AND SYSTEM FOR CONFIGURING DEVICE-TO-DEVICE COMMUNICATION," filed Oct. 12, 2016, which is a national stage application of International Application No. PCT/JP2015/001402 entitled "Method and System for Configuring Device-to-Device Communication" filed on Mar. 13, 2015, which claims the benefit of priority from Australian Patent Application No. 2014901540, filed on Apr. 29, 2014, the disclosures of which are incorporated herein in their entirety by reference thereto.

BACKGROUND ART

Abbreviations

The following abbreviations are used herein:

| | |
|---|---|
| ACK | Acknowledgement |
| D2D | Device to Device Communication |
| D2D-UE | Cellular User equipment with direct communication capability |
| DL | Downlink |
| ePDCCH | enhanced Physical Downlink Control Channel |
| FDD | Frequency Division Duplexing |
| FDM | Frequency Division Multiplexing |
| HARQ-ACK | Hybrid Automatic Repeat Request Acknowledgement |
| LTE | Long Term Evolution |
| NAK | Negative Acknowledgement |
| PDCCH | Physical Downlink Control Channel |
| PDSCH | Physical Downlink Shared Channel |
| PHICH | Physical Hybrid ARQ Indicator Channel |
| QoS | Quality of Service |
| RRC | Radio Resource Control |
| SF | Subframe |
| TDD | Time Division Duplexing |
| TDM | Time Division Multiplexing |
| UE | User Equipment |
| UL | Uplink |

Recent advancements in the field of wireless communication includes utilising spectrum generally allocated for cellular communication for instead performing direct communication between one mobile device and another mobile device, or among a group of mobile devices within the local vicinity. This is widely known as device-to-device (D2D) communication or peer-to-peer (P2P) communication. Direct communication between mobile devices with or without the coordination of an overlay cellular communication network may have many advantages including, but not limited, to improving overall spectral efficiency, improving local coverage, facilitating traffic offloading from a cellular network and enabling various types of new services and applications.

SUMMARY OF INVENTION

Technical Problem

D2D communication can generally be performed in two ways, namely network controlled D2D and autonomous D2D. Network controlled D2D can be performed in both FDD and TDD cellular networks with either shared UL or DL resources or with dedicated D2D resources. Autonomous D2D communication may operate in a dedicated spectrum for D2D, or in unlicensed spectrum. In comparison to autonomous D2D, network controlled D2D may more efficiently utilise network resources and thus provide better quality of service (QoS) levels.

Currently, there are no suitable methods to configure D2D and cellular resource multiplexing in TDD and FDD cellular systems. Accordingly, there is a need for an improved method and system for configuring D2D communication.

It will be clearly understood that, if a prior art publication is referred to herein, this reference does not constitute an admission that the publication forms part of the common general knowledge in the art in Australia or in any other country.

Solution to Problem

The present invention is directed to control signalling in advanced wireless communication networks, which may at least partially overcome at least one of the abovementioned disadvantages or provide the consumer with a useful or commercial choice.

With the foregoing in view, the present invention in one form, resides broadly in a method for use in an advanced wireless communication network, the method comprising:

providing, to a group of UEs, a resource multiplexing configuration that defines resource multiplexing for cellular and non-cellular communications; and allocating resources to the group of UEs for cellular communication, according to the resource multiplexing configuration.

Advantageously, the resource multiplexing configuration enables collisions and interference between non-cellular (e.g. D2D) and cellular transmissions to be reduced or avoided.

According to certain embodiments, the non-cellular communication comprises device-to-device (D2D) communication.

According to other embodiments, the method further comprises receiving, from a UE of the group of UEs, a request to allocate resources for non-cellular communication, wherein the resource multiplexing configuration is provided to the group of UEs in response to the request.

According to certain embodiments, the resource multiplexing configuration includes a resource multiplexing mask defining a resource allocation pattern for cellular and non-cellular communication. The resource multiplexing mask can be defined by a bitmap. The bitmap can define a resource allocation for at least one radio frame of the resource allocation pattern. Each bit of the bitmap can define whether a subframe is allocated to cellular or non-cellular communication.

The resource multiplexing configuration can define fixed resources for cellular communication, and flexible resources that can be allocated for cellular or non-cellular communication. In such case, the resource multiplexing mask can be defined by a bitmap, wherein each bit of the bitmap defines a resource allocation for the flexible resources.

As certain resources are fixed for cellular communication, i.e. cannot be used for non-cellular communication, it is not required to explicitly signal any resource allocation to the group of UEs. As a result, signalling overhead can be reduced by not explicitly signalling resource allocations for resources that are fixed for cellular communication.

According to certain embodiments, the resource multiplexing mask defines a resource allocation for 10 consecutive subframes, wherein a first three subframes of the resource multiplexing mask are permanently fixed for cellular communication. As a result only 7 bits are required to signal the resource multiplexing mask.

According to other embodiments, the resource multiplexing mask defines a resource allocation for 10 consecutive subframes, and wherein subframes 0, 1, 2, 5 and 6 of the resource multiplexing mask are fixed for cellular communication.

In LTE TDD systems, subframes 0, 1, 5 and 6 carry important channels/signals such as PSS, SSS and paging channels. If these subframes are allocated for D2D communication, the D2D-UEs involved in that communication may fail to receive and decode system information and messages on these subframes.

According to yet other embodiments, the resource multiplexing mask defines a resource allocation for 10 consecutive subframes, and wherein subframes 0 and 5 of the resource multiplexing mask are fixed for cellular communication.

In LTE FDD systems, DL subframes 0 and 5 may carry important signals such as PSS and SSS. If these subframes in DL spectrum are allocated for D2D communication, the D2D-UEs involved in that communication may fail to maintain synchronisation with the cellular system.

According to other embodiments again, the resource multiplexing mask defines a resource allocation for 10 consecutive subframes, and wherein subframes 0, 4, 5 and 9 of the resource multiplexing mask are fixed for cellular communication.

In an LTE FDD system, in addition to DL subframes 0 and 5 being used for PSS, SSS and paging, DL subframes 4 and 9 can also be used for paging channel transmission. If these subframes in DL spectrum are allocated for D2D communication, the D2D-UEs involved in that communication may fail to receive and decode paging information intended for them. If these subframes in UL spectrum are allocated for D2D communication, there may be severe in-device interference at receiving D2D UEs who simultaneously receive cellular DL and D2D signals in UL spectrum, in which case the important system information would be interfered by D2D reception.

According to certain embodiments, the method further comprises providing, to a second group of UEs, a second resource multiplexing configuration defining resource multiplexing for cellular and non-cellular communication; wherein the resource multiplexing configuration and the second resource multiplexing configuration are configured to minimise interference between the group of UEs and the second group of UEs.

The resource multiplexing configuration can be defined in a communication interval in an integer number of radio frames, the communication interval defining resource multiplexing for a plurality of groups of UEs, the resource multiplexing configuration defined by a configuration offset, and the configuration offset defining an offset of a configuration interval with respect to the communication interval.

Advantageously, the configuration offset $T_0$ allows the base station to separate D2D communication resources of different groups of UEs in time, thus providing time-domain interference management.

The second resource multiplexing configuration can be defined in the communication interval, the second resource multiplexing configuration defined by a second configuration offset, and the second configuration offset defining an offset of a second configuration interval with respect to the communication interval.

The communication interval can comprise one of: one; four; eight; sixteen; thirty two; or sixty four radio frames, and be repeated periodically once configured. Similarly, the configuration interval can comprise one of: one, four or eight radio frames.

The resource multiplexing configuration can be at least partly provided by an RRC message. Similarly, resources can be at least partly allocated for cellular or non-cellular communication dynamically by TDD eIMTA.

The cellular communication can, for example, be FDD or TDD based.

The group of UEs can comprise a pair of UEs, or more than two UEs.

According to certain embodiments, the method further comprises receiving, from a UE of the group of UEs, a scheduling pattern for group of UEs in relation to non-cellular communication. The scheduling pattern can be repeatedly applied by the UEs in the group of UEs to determine which UE should transmit in each configured non-cellular time interval. On a particular subframe or subframes in a scheduling pattern that is allocated to a particular UE for non-cellular communication, the UE may piggyback ACK/NAK feedback associated with previously received data with its data transmission for feedback option or perform repetition of its data transmission. When the UE has piggybacked ACK/NAK feedback with its data transmission, re-transmission of a message can be performed if, at the next transmission opportunity, either all received feedback are NAKs, or if no feedback is received. Alternatively, a number of repetitions can be predefined for being combined decoding or selective decoding at a receiver or receivers.

In another form, the present invention resides broadly in a system for advanced wireless communication, the system, including:
 a group of UEs; and
 a base station, the base station including:
 a transmitter;
 a processor coupled to the transmitter; and
 a memory coupled to the processor, the memory including instruction code executable by the processor for:
  providing, to a group of UEs, a resource multiplexing configuration defining resource multiplexing for cellular and non-cellular communication; and
  allocating resources to the group of UEs for cellular communication, according to the resource multiplexing configuration.

Advantages of certain embodiments of the present invention include an ability to provide a method to configure cellular and D2D resource multiplexing that allows time-domain interference management between D2D groups/pairs.

Certain embodiments of the present invention provide a method for a base station to provide one of several possible resource multiplexing configurations to D2D-UEs or D2D groups using a resource multiplexing mask and/or and optimised bitmap for TDD and FDD.

Other embodiments provide four different resource multiplexing masks that can be used to cover almost every D2D and cellular multiplexing configuration in TDD and FDD. These resource multiplexing masks can enable the reception of important system information in TDD and FDD systems, and avoid possible cellular and D2D transmission collisions in TDD by allowing for the use of reference configurations for HARQ-ACK, UL grant and PHICH timing.

Embodiments of the present invention provide a simple, yet efficient method for performing D2D communication within D2D groups.

According to certain embodiments of the present invention, legacy LTE devices are not impacted.

Any of the features described herein can be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 9 illustrates a schematic of an exemplary cellular communication scenario in an FDD system, according to an embodiment of the present invention;

DESCRIPTION OF EMBODIMENTS

Figure 1:
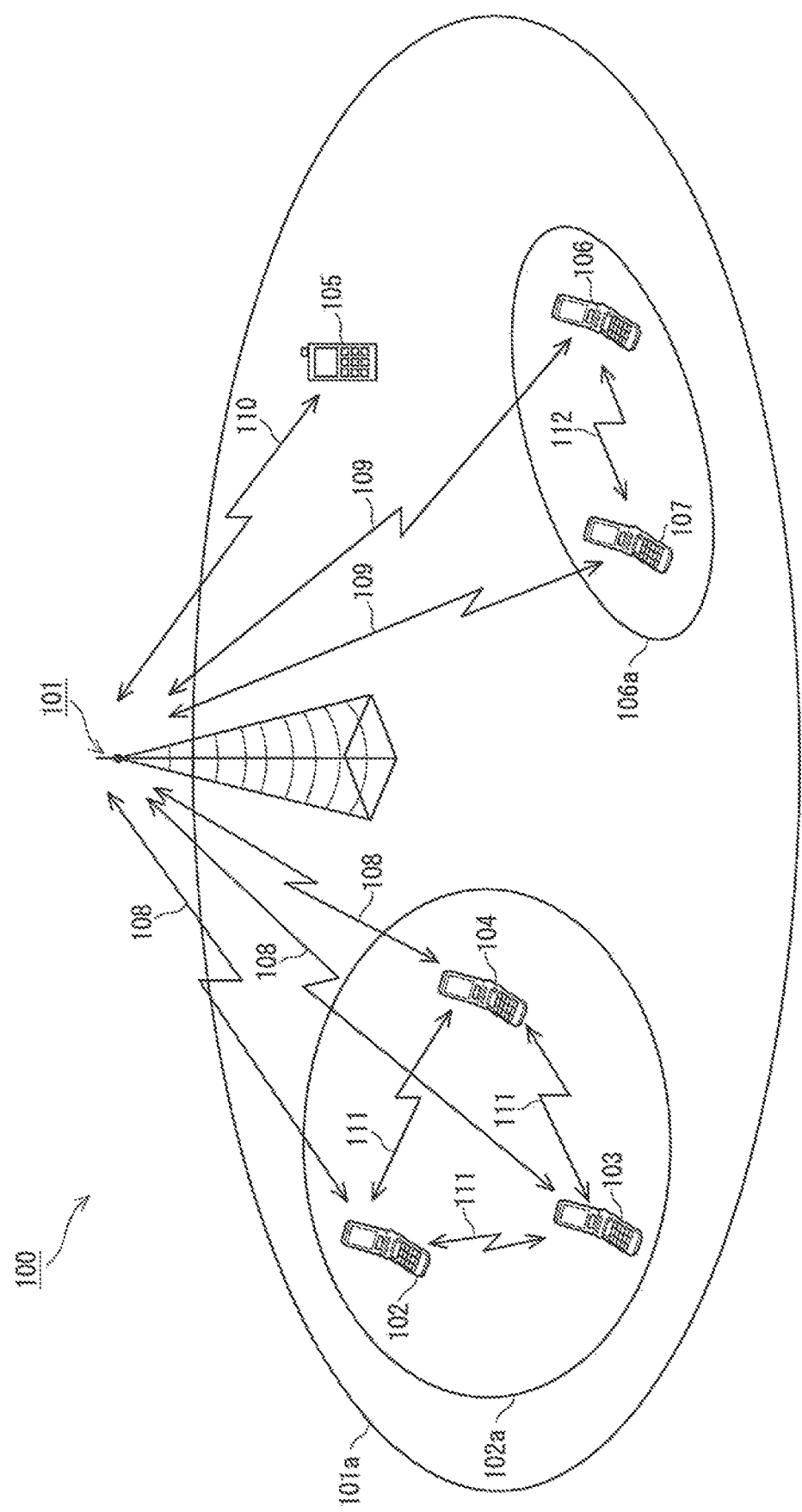
FIG. 1 is a schematic diagram illustrating a wireless communication system, according to an embodiment of the present invention.

FIG. 1 is a schematic diagram illustrating a wireless communication system 100, according to an embodiment of the present invention. The wireless communication system 100 enables transmission and reception of cellular and D2D resource multiplexing configurations, as discussed in further detail below.

The wireless communication system 100 is a typical single cell cellular network comprising an access node 101 representing a cellular base station providing a first coverage 101.a and services to plurality of user equipment (UE) 102-107. The access node 101 can be an FDD or a TDD access node.

Among the plurality of UEs 102-107, there may be more than one UE that is capable of performing both cellular communication and direct/D2D communication. The plurality of UEs 102-107 may further include a legacy UE (such as UE 105) that is capable of performing typical cellular communication 110 only.

According to one embodiment, D2D-UEs that are in close proximity to each other, such as UEs 102, 103 and 104, may discover each other, synchronise to each other and form a D2D group for one-to-many group communication or groupcasting, as illustrated by D2D group 102.a.

The D2D-UEs in such a D2D group may be configured by the base station 101 to use cellular resources (UL resources, DL resources or both), or to directly communicate within the group. These D2D-UEs may then communicate with each other using a direct communication link 111, while maintaining a cellular communication link 108 with the base station 101 on subframe basis. The cellular communication link 108 may be used by the D2D-UEs for typical cellular communication (and maintaining RRC connectivity), and for receiving and sending D2D communication related information such as D2D and cellular multiplexing configuration information, new group member detection information and D2D channel state reports.

In another embodiment, when two D2D-UEs are in close proximity to each other, as for example illustrated by UEs 106, 107, they may discover each other, synchronise to each other and pair with each other to form a direct one-to-one communication pair, as illustrated by D2D-pair 106.a. These D2D-UEs may also be configured by the base station 101 to use cellular resources (UL resources, DL resources or both), or to directly communicate with each other using a direct communication link 112 while also maintaining a cellular communication link 109 with the base station 101. The cellular communication link 109 may be used by the D2D-UEs for typical cellular communication (and maintaining RRC connectivity), and for receiving and sending D2D communication related information such as D2D and cellular multiplexing configuration information and D2D channel state reports.

For the sake of clarity, the specification hereon refers to groups of D2D-UEs as including a pair of D2D-UEs, or more than two D2D-UEs.

The system 100 provides a method to allocate resources for cellular and D2D communication, as described in further detail below. Allocating resources for cellular and D2D communication can, for example, comprise multiplexing cellular and D2D resources when D2D-UEs share cellular resources for D2D communication, as discussed below.

Figure 2:
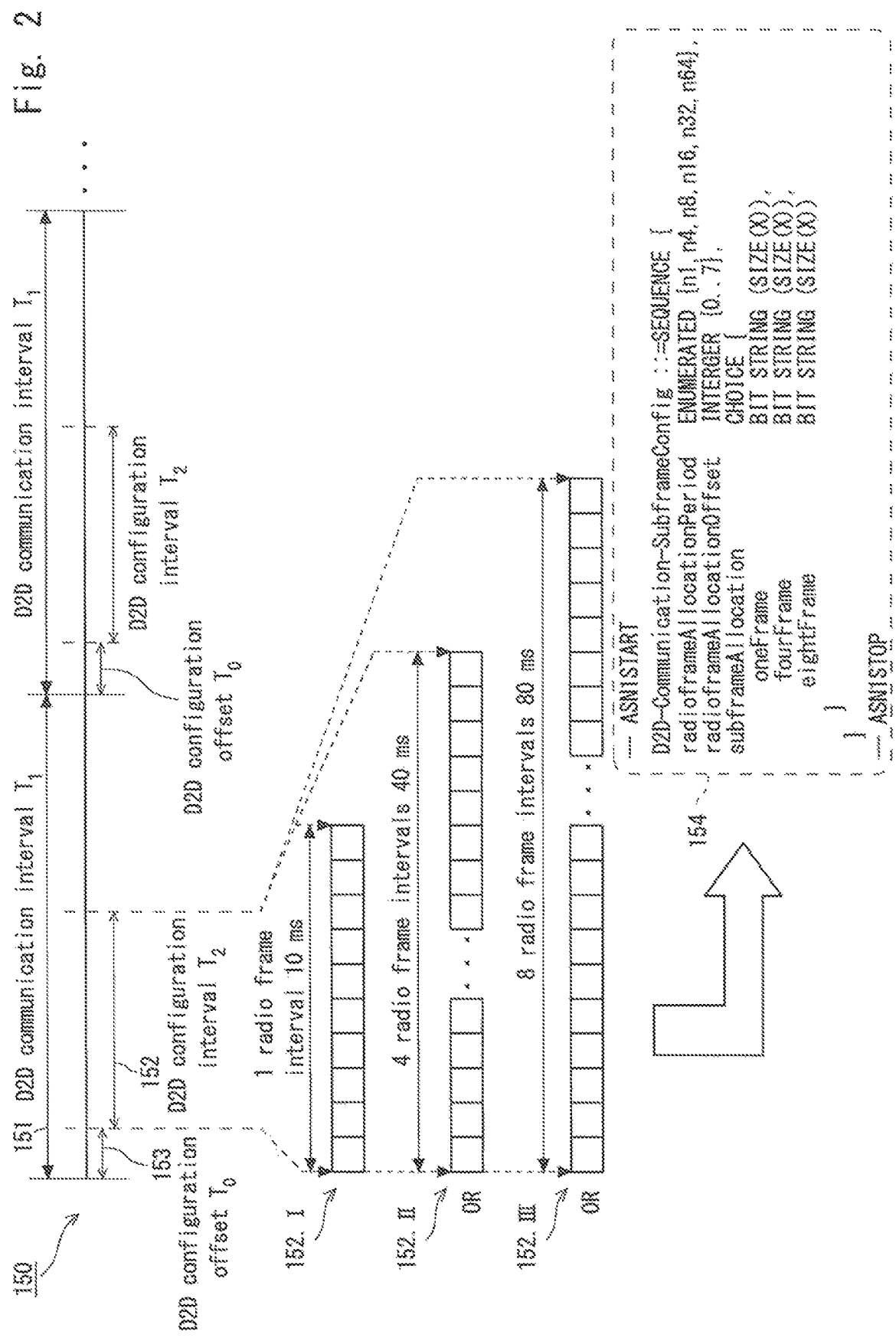
FIG. 2 illustrates a method of resource allocation for cellular and D2D communication in a TDD/FDD system, according to an embodiment of the present invention.

FIG. 2 illustrates a method 150 of resource allocation for cellular and D2D communication in a TDD/FDD system, according to an embodiment of the present invention.

A D2D communication interval 151 (denoted by $T_1$) is provided, which includes a D2D configuration interval 152 (denoted by $T_2$) and a D2D configuration offset 153 (denoted by $T_0$). The D2D communication interval $T_1$/151 may be configurable, e.g. to a user configured number of radio frames in an LTE communication system. Once being configured, the D2D configuration interval $T_1$/151 is repeated until reconfigured or terminated.

The D2D configuration interval $T_2$/152 may be configured within a D2D communication interval $T_1$/151 to last for 1 radio frame (as illustrated by 152.I), 4 radio frames (as illustrated by 152.II) or 8 radio frames (as illustrated by 152.III). Furthermore, a pattern can be provided to indicate on subframe level which subframes being allocated to cellular communication and which subframes being allocated to D2D communication.

According to certain embodiments, $T_1$ is configurable to span for one radio frame (n1), four radio frames (n4), eight radio frames (n8), sixteen radio frames (n16), thirty-two radio frames (n32) or sixty-four radio frames (n64).

The D2D configuration offset $T_0$/153 can be used to indicate at which radio frame the D2D configuration interval $T_2$/152 starts, with reference to the D2D communication interval $T_1$/151. The configurable D2D configuration offset $T_0$/153 allows the system to have time-multiplexed intervals of D2D communication for different groups (or pairs) of D2D-UEs, and thus enables time-domain interference management.

Furthermore, the D2D configuration interval $T_2$/152 may be less than or equal to the D2D communication interval $T_1$/151. The resource multiplexing pattern configured for the D2D configuration interval $T_2$/152 is then started after the D2D configuration offset $T_0$/153, i.e. an amount of time (e.g. a number of radio frames in an LTE communication system) from the beginning of the D2D communication interval $T_1$/151.

The D2D configuration offset $T_0$/153, the D2D communication interval $T_1$/151, and the D2D configuration interval $T_2$/152 can be configured using RRC signalling. A sample of corresponding RRC signalling is illustrated in RRC sample 154.

In accordance with certain embodiments of the present invention, a resource multiplexing mask is used to indicate a resource allocation pattern for cellular and D2D communication within the D2D configuration interval 152/$T_2$. The resource multiplexing mask may include fixed resource elements for cellular communication and flexible resource elements that can be allocated for either cellular or D2D communication. The flexible resource elements can be configured by the base station 101 via RRC messages in LTE communication. Furthermore, in the case that the system 100 supports TDD eIMTA, the flexible resource elements can be dynamically allocated for cellular or D2D communication on a radio frame basis.

The resource allocation pattern defined by the resource allocation mask is signalled to the D2D-UEs using a bitmap that is X bits long. According to certain embodiments, a bitmap of X=10 bits is used to indicate the resource allocation mask for a radio frame, where each bit within the 10-bit string indicates if a certain subframe within that radio frame belongs to cellular communication or D2D communication.

According to alternative embodiments, described in further detail below, the bitmap is optimised for resource configuration in TDD and FDD systems, and thus requires less than 10 bits.

Figure 3:
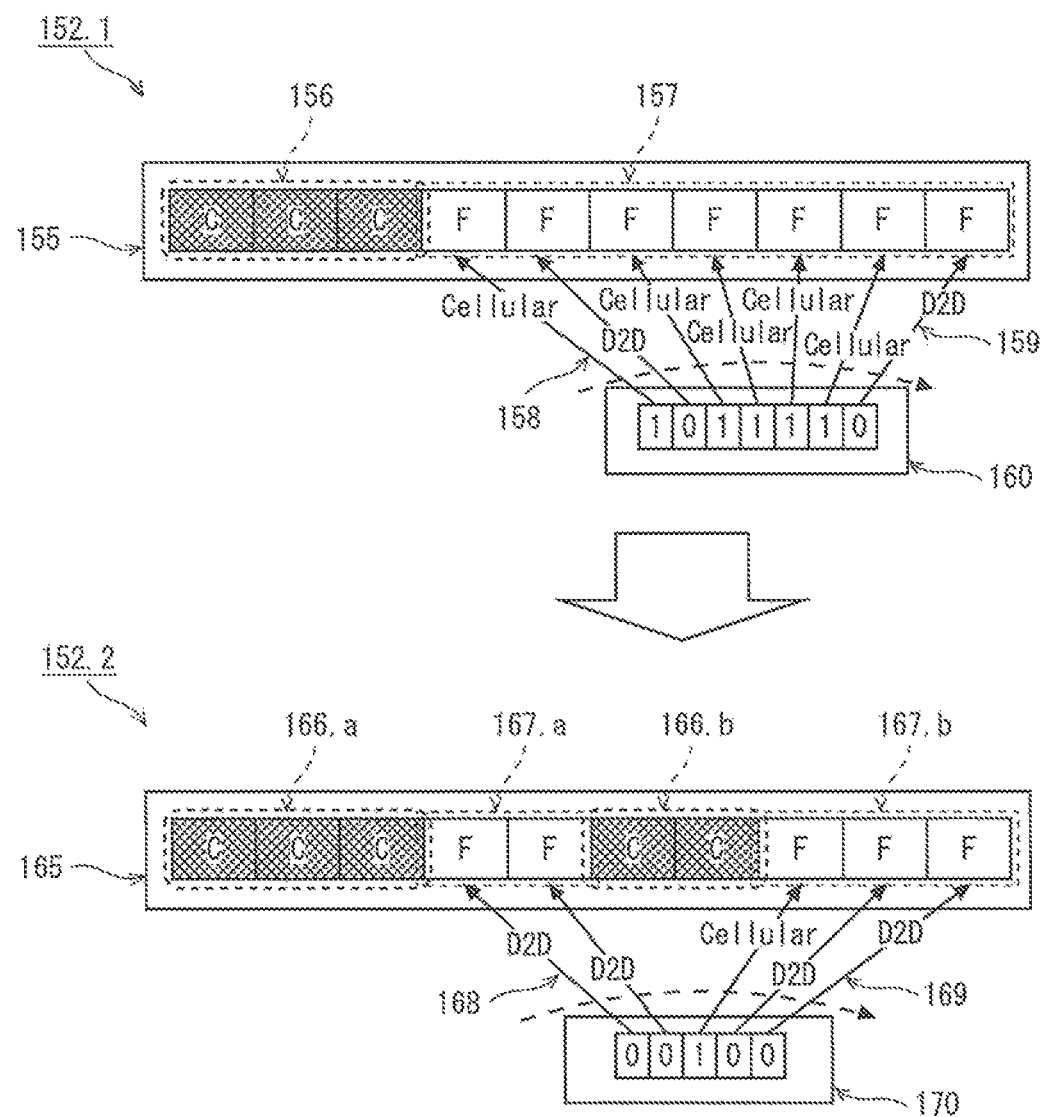
FIG. 3 illustrates resource multiplexing masks and corresponding bitmaps for multiplexing D2D and cellular resources in TDD systems, according to an embodiment of the present invention.

FIG. 3 illustrates resource multiplexing masks and corresponding bitmaps for multiplexing D2D and cellular resources in TDD systems, according to an embodiment of the present invention.

A first method 152.1 for optimising a bitmap for an LTE TDD communication system is illustrated, wherein a first resource multiplexing mask 155 of 10 time units/subframes is provided. The first three time units/subframes 156 of the first resource multiplexing mask 155 are permanently fixed for cellular communication, and last seven subframes 157 are flexibly allocated for either cellular communication or D2D communication. This resource multiplexing pattern allows for all seven LTE TDD UL/DL configurations to have reference UL/DL configurations for cellular communication in D2D-UEs without HARQ-ACK and/or UL grant collisions.

As the first three time units/subframes 156 are fixed for cellular communication, the base station 101 does not need to signal this information to the D2D-UEs, and as such, the bitmap can be reduced by three bits. Thus, an optimised bitmap 160 for the resource multiplexing mask 155 is provided that is seven bits long. This optimised bitmap 160 may be used to indicate resource multiplexing pattern within the flexible resources 157 as depicted by indicators 158 to 159.

However, in LTE TDD systems, subframes 0, 1, 5 and 6 carry important channels/signals such as PSS, SSS and paging channels. If these subframes are allocated for D2D communication, the D2D-UEs involved in that communication may fail to receive system information and messages on these subframes. Therefore, according to yet a further embodiment of the present invention, those subframes are fixed for cellular communication. As such, the size of the bitmap for TDD systems can be further reduced by two bits as illustrated in a second method 152.2 for optimising a bitmap for an LTE TDD communication system.

The second method 152.2 is illustrated with reference to a second resource multiplexing mask 165 of 10 time units/subframes, wherein the first three subframes 166.a are fixed for cellular communication, the following two subframes 167.a are flexibly allocated for cellular/D2D, the followed two subframes 166.b are fixed for cellular communication, and last three time units/subframes 167.b are flexibly allocated for cellular/D2D communication. As such, a further optimised bitmap 170 of five bits long can be provided. The further optimised bitmap 170 may be used to indicate resource multiplexing pattern within the flexible resources (167.a and 167.b) as depicted by indicators 168 to 169.

Figure 4:
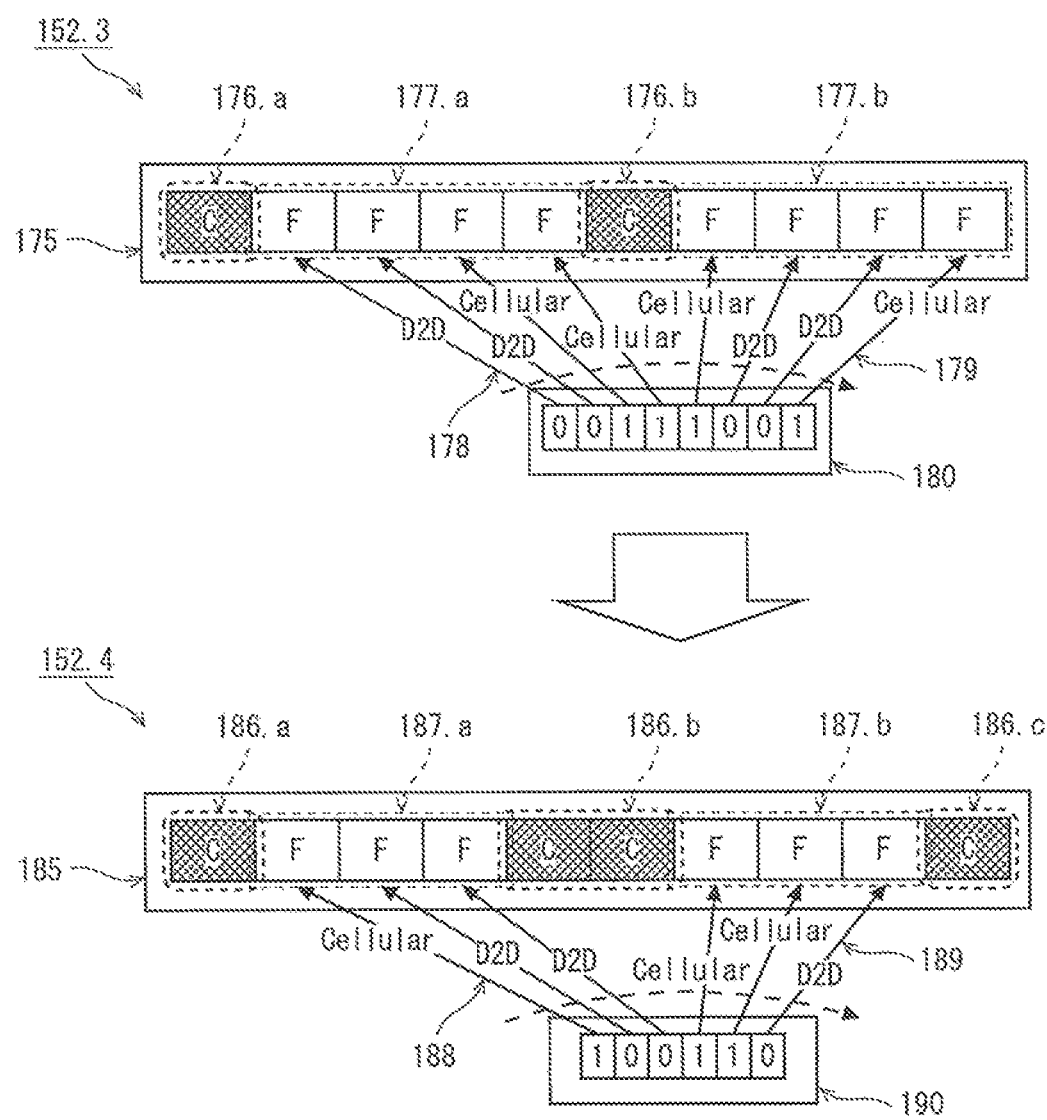
FIG. 4 illustrates resource multiplexing masks and corresponding bitmaps for multiplexing D2D and cellular resources in FDD systems, according to an embodiment of the present invention.

FIG. 4 illustrates resource multiplexing masks and corresponding bitmaps for multiplexing D2D and cellular resources in FDD systems, according to an embodiment of the present invention.

A first method 152.3 for optimising a bitmap for an LTE FDD communication system is illustrated, wherein a first resource multiplexing mask 175 of 10 time units/subframes is provided. The resource multiplexing mask 175 includes one time unit/subframe 176.a that is permanently fixed for cellular communication, followed by four subframes 177.a that are flexibly allocated for either cellular or D2D communication, followed by another one subframe 176.b that is fixed for cellular communication, and last four subframes 177.b are again flexibly allocated for either cellular or D2D communication.

In LTE FDD systems, DL subframes 0 and 5 may carry important signals such as PSS and SSS. On the one hand, if these subframes in DL spectrum are allocated for D2D communication, the D2D-UEs involved in that communication may fail to maintain synchronisation with the system. On the other hand, if these subframes in UL spectrum are allocated for D2D communication, there may be severe in-device interference at a receiving D2D UEs that simultaneously receives cellular DL and D2D signals. In such case, the important system information would be interfered by D2D reception.

According to an embodiment of the present invention, these subframes are thus fixed for cellular communication. As a result, an optimised bitmap 180 of eight bits long is provided. This optimised bitmap 180 may be used to indicate resource allocation within the flexible time units/subframes 177.a and 177.b, as depicted by indicators 178 to 179 in FIG. 4.

In an LTE FDD system, apart from DL subframes 0 and 5 being used for PSS, SSS and paging, DL subframes 4 and 9 are also used for paging channel transmission. On the one hand, if these subframes in DL spectrum are allocated for D2D communication, the D2D-UEs involve in that communication may fail to receive paging information. On the other hand, if these subframes in UL spectrum are allocated for D2D communication, there may be severe in-device interference at receiving D2D UEs who simultaneously receive cellular DL and D2D signals in UL spectrum, in which case the important system information would be interfered by D2D reception. Therefore, it is desirable to fix these subframes for cellular communication. Therefore, the method discussed above can be further reduced by two bits, as illustrated by method 152.4 of FIG. 4.

The method 152.4 is illustrated with reference to a resource multiplexing mask 185 of 10 subframes, wherein the first subframe 186.a is fixed for cellular communication, the following three subframes 187.a are flexibly allocated to cellular or D2D communication, followed by two subframes 186.b that are fixed for cellular communication, followed by another three subframes 187.b that are flexibly allocated to D2D or cellular communication, and last subframe 186.c that is also fixed for cellular communication. This results in a further optimised bitmap 190 of six bits long. This further optimised bitmap 190 may be used to indicate resource allocation within the flexible time units/subframes 187.a and 187.b, as depicted by indicators 188 to 189 in FIG. 4.

Figure 5:
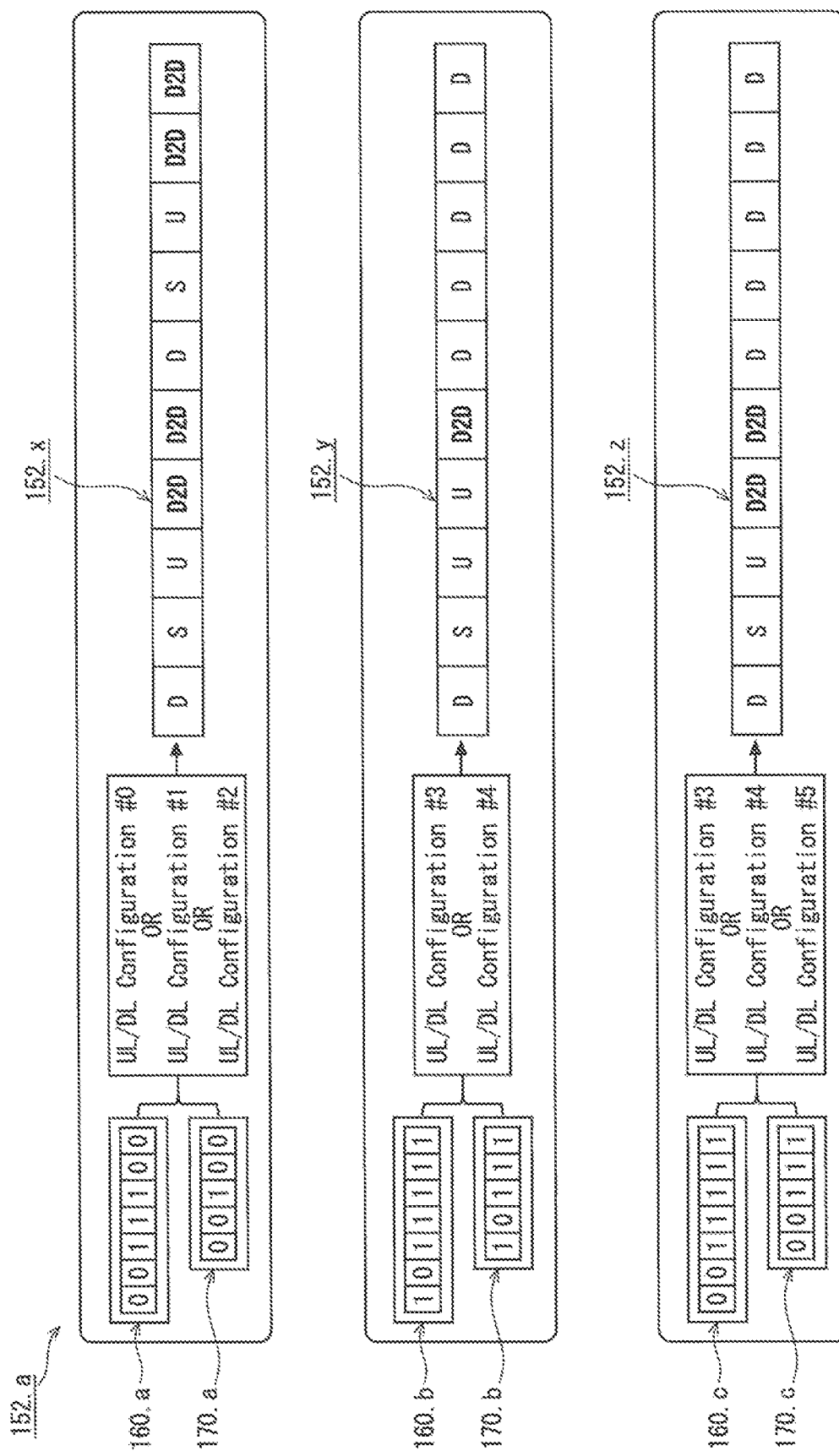
FIG. 5 illustrates a plurality of resource multiplexing configurations in TDD systems, according to an embodiment of the present invention.

FIG. 5 illustrates a plurality of resource multiplexing configurations 152.a in TDD systems, according to an embodiment of the present invention. The resource multiplexing configurations 152.a may be signalled to the D2D-UEs using either a first bitmap 160 or a second bitmap 170 in LTE TDD systems.

In one embodiment, the bitmaps 160.a and 170.a may be used in LTE TDD systems that employ UL/DL configuration 0 or UL/DL configuration 1 or UL/DL configuration 2, to signal a first cellular and D2D multiplexing pattern 152.x, as illustrated in FIG. 5.

In another embodiment, the bitmap 160.b and bitmap 170.b may be used in LTE TDD systems that employ UL/DL configuration 3 or UL/DL configuration 4, to signal a second signal cellular and D2D multiplexing pattern 152.y, as illustrated in FIG. 5.

In yet another embodiment, the bitmap 160.c and bitmap 170.c may be used in LTE TDD systems that employ UL/DL configuration 3, UL/DL configuration 4 and UL/DL configuration 5, to signal cellular and D2D multiplexing pattern 152.z, as illustrated in FIG. 5.

Figure 6:
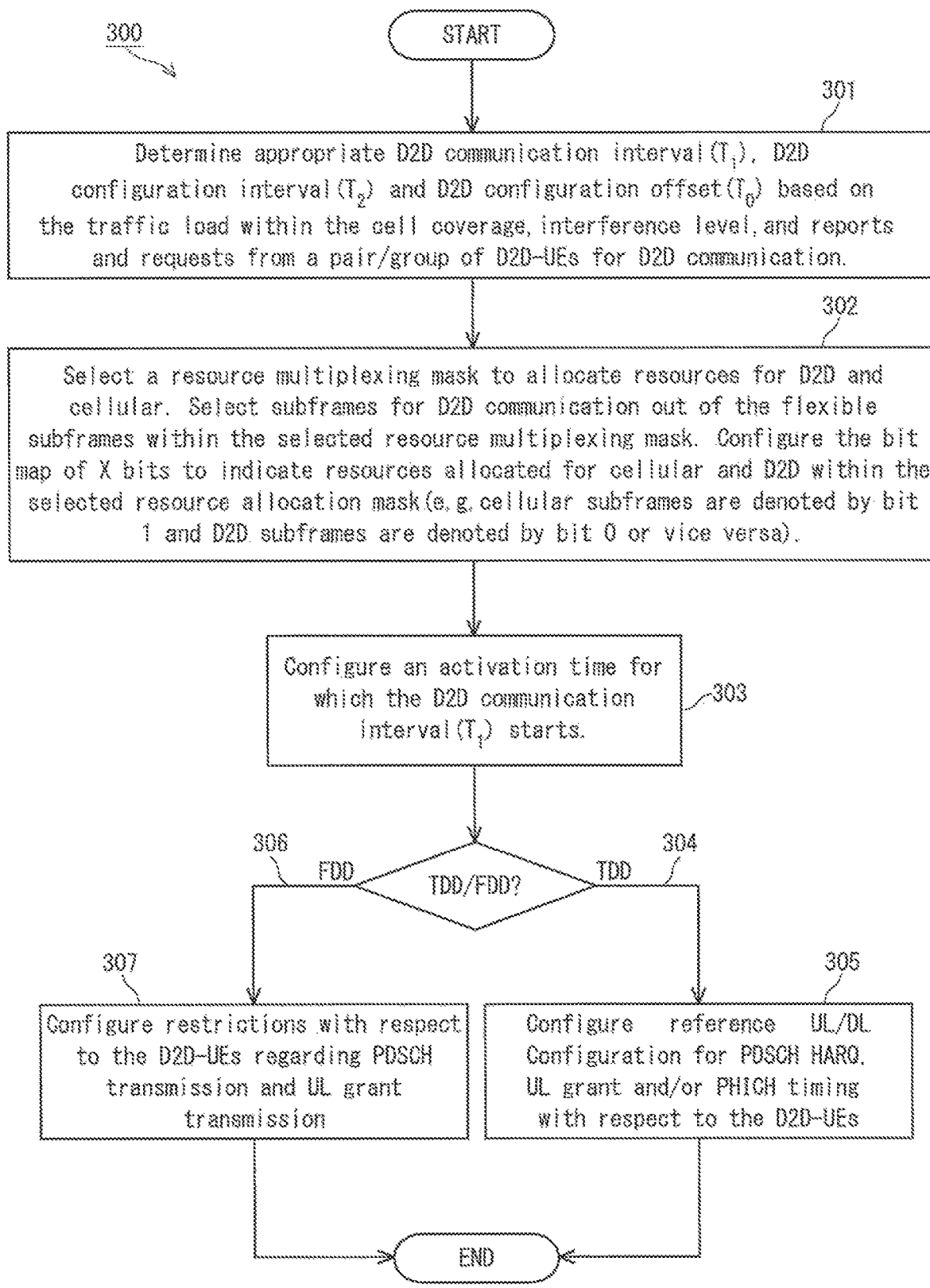
FIG. 6 illustrates a method of resource allocation or multiplexing for D2D and cellular communication at a cellular base station, according to an embodiment of the present invention.

FIG. 6 illustrates a method 300 of resource allocation or multiplexing for D2D and cellular communication, according to an embodiment of the present invention. The method 300 can, for example, be implemented at a base station similar to base station 101.

At block 301, traffic load within the cell coverage is observed, together with interference level reports and requests from D2D-UEs that are paired or grouped for direct communication with each other. An appropriate D2D communication interval, a D2D configuration interval and D2D configuration offset are then determined according to the traffic load, the interference level, and the reports and requests. The D2D communication interval can be similar to the D2D communication interval $T_1$/151 of FIG. 1, the D2D configuration interval can be similar to the D2D configuration interval $T_2$/152 of FIG. 1, and the D2D configuration offset can be similar to the D2D configuration offset $T_0$/153 of FIG. 1.

At block 302, a resource multiplexing mask is selected, which may, for example, be one of the masks 155, 165, 175, or 185 described above, to allocate resources for D2D and cellular communications. The resource multiplexing mask includes fixed cellular communication subframes, which cannot be used for D2D communications, and flexible cellular communications subframes, which can be used for either cellular or D2D communications.

Subframes are then selected for D2D communication out of the flexible subframes within the selected resource multiplexing mask. This selection may depend on the spectrum allowed for D2D communication, the UL/DL configuration of the cell in TDD systems, cellular traffic conditions within the cell, buffer status of the D2D-UEs for D2D communication, and/or a priority of D2D communication over cellular communication.

A bitmap of X bits is then used to indicate which resources are allocated for cellular communication, and which resources are allocated for D2D communication, within the selected resource multiplexing mask. X may be, for example 10, 8, 7, 6, or 5 bits. For example, cellular resources may be denoted by bit '1' and D2D resources may be denoted by bit '0', or vice versa.

The method 300 further includes configuring an activation time from which the D2D communication interval starts, at block 303.

If the base station is an FDD system (indicated by arrow 306), the method 300 will further configure restrictions enforced at the base station with respect to the said D2D-UEs, at block 307. The restrictions are regarding PDSCH transmission and UL grant transmission, and may include:
  Avoiding PDSCH transmission to D2D-UEs in subframe n if subframe n+4 has been allocated for D2D communication at the D2D-UEs, and
  Avoiding UL grant transmission on PDCCH/ePDCCH to D2D-UEs in subframe n if subframe n+4 has been allocated for D2D communication at the said D2D-UEs.

If, on the other hand, the base station is a TDD system (indicated by arrow 304), the method 300 will further configure, at block 305, reference UL/DL configuration for PDSCH HARQ-ACK, UL grant and/or PHICH timing with respect to the D2D-UEs. This is performed to ensure that subframe(s) allocated for D2D communication will not impact on the cellular communication.

Figure 7A:
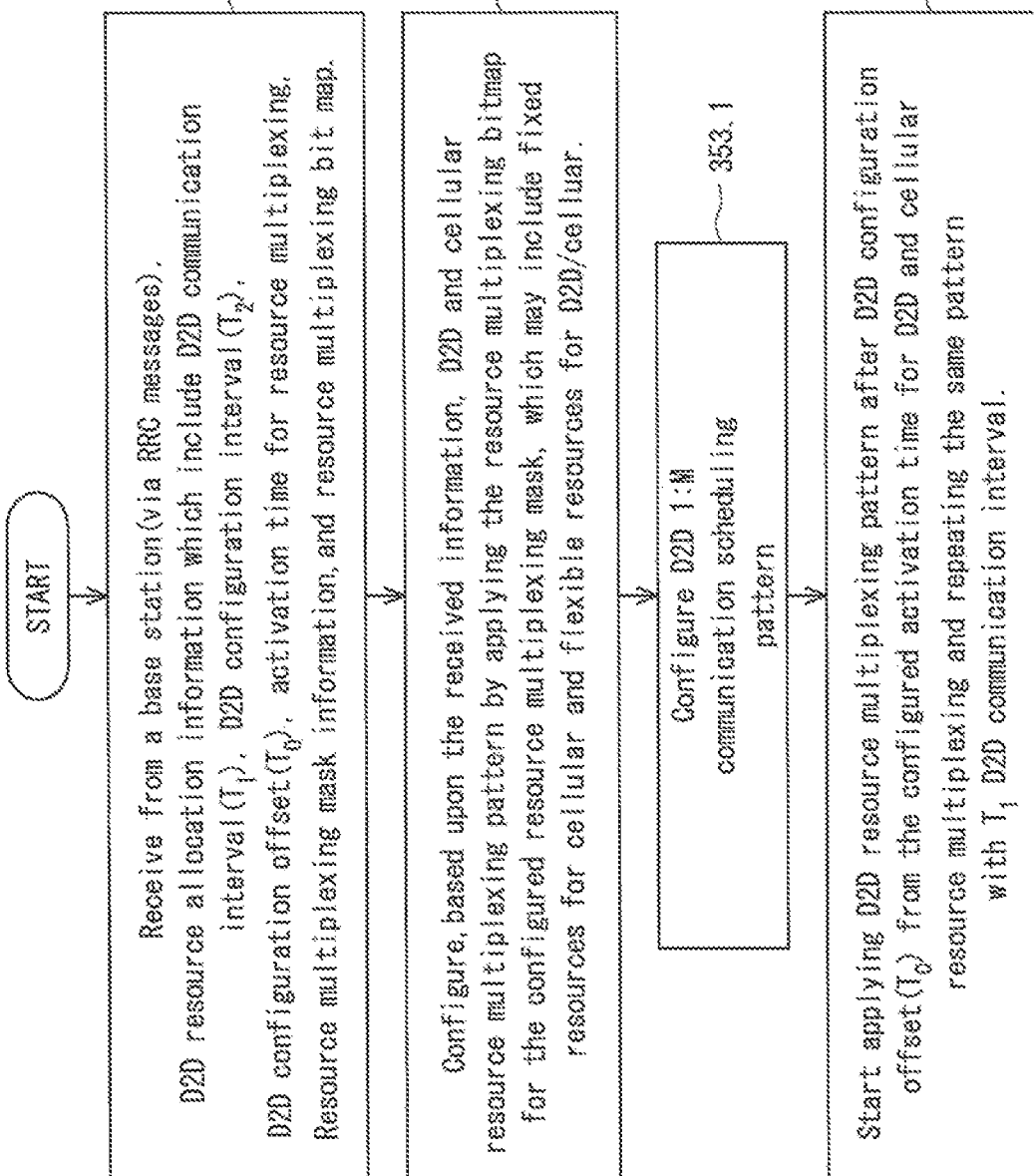
FIG. 7A illustrates a method for resource allocation or multiplexing for D2D and cellular at a D2D capable UE in an FDD system, according to an embodiment of the present invention.
Figure 7B:
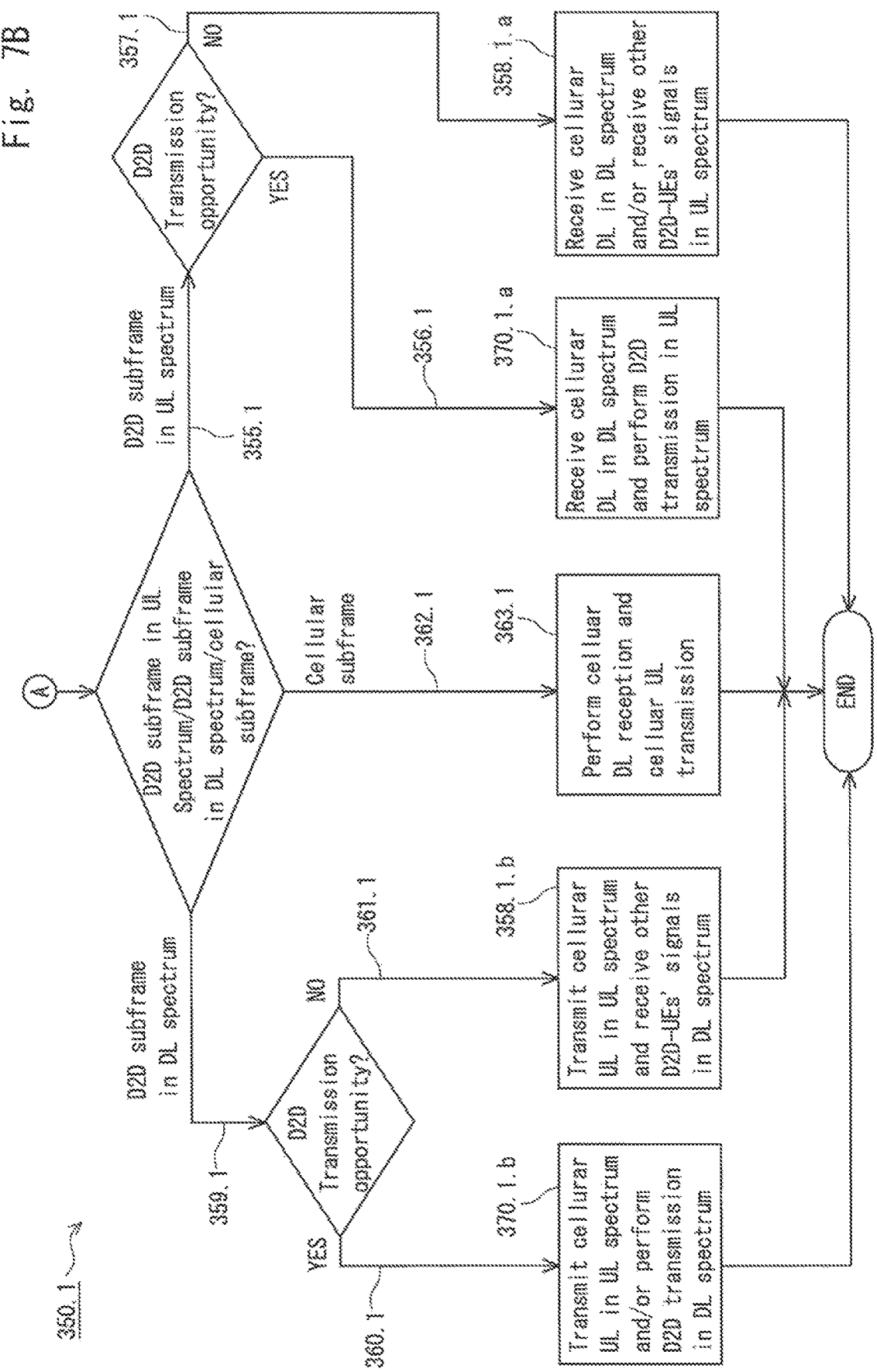
FIG. 7B illustrates a method for resource allocation or multiplexing for D2D and cellular at a D2D capable UE in an FDD system, according to an embodiment of the present invention.

FIG. 7A and FIG. 7B illustrate a method 350.1 for resource allocation or multiplexing for D2D and cellular at a UE in an FDD system, according to an embodiment of the present invention.

At block 351.1, D2D resource allocation information is received, for example from a base station such as the base station 101 of FIG. 1, and preferably via RRC messaging. The D2D resource allocation information can include a D2D communication interval, D2D configuration interval, a D2D configuration offset, resource multiplexing mask information, an activation time for resource multiplexing and a resource multiplexing bitmap.

If the activation time is not provided, then the D2D-UE will apply the configuration from the next coming radio frame. Based upon received information, a D2D-UE configures a D2D and cellular resource multiplexing pattern by applying the resource multiplexing bitmap for the configured resource multiplexing mask, at block 352.1. As discussed above, the multiplexing pattern may include fixed resources for cellular communication and flexible resources for D2D/cellular communication.

At block 353.1, a D2D scheduling pattern is configured which indicates the order of transmission for the D2D-UEs, as discussed above.

A person of ordinary skill in the art will readily appreciate that the procedures presented in blocks 352.1 and 353.1 may be executed by the D2D-UEs in the same order or in a different order.

Upon configuring the resource allocation patterns for D2D and cellular, the D2D-UEs apply the D2D resource multiplexing pattern after the D2D configuration offset from the configured activation time for D2D communication interval, at block 354.1. The same pattern is repeated with the D2D communication interval. After starting D2D and cellular resource multiplexing, the D2D-UEs may perform following operations at each subframe within the D2D communication interval $T_1$.

If the current subframe is a D2D subframe in UL spectrum (indicated by arrow 355.1), and it is a transmission opportunity according to the D2D scheduling pattern (indicated by arrow 356.1), the D2D-UE may receive cellular DL in DL spectrum, and perform D2D transmission in UL, as illustrated by block 370.1.*a*.

If the current subframe is a D2D subframe in UL spectrum (indicated by arrow 355.1), but it is not a D2D transmission opportunity according to the D2D scheduling pattern (indicated by arrow 357.1), the D2D-UE may receive cellular DL in DL spectrum and/or receive other D2D-UEs' signals in UL spectrum, as illustrated by block 358.1.*a*.

If the current subframe is a D2D subframe in DL spectrum (indicated by arrow 359.1), and it is a transmission opportunity according to the D2D scheduling pattern (indicated by arrow 360.1), the D2D-UE may transmit cellular UL in UL spectrum, and/or may perform D2D transmission in DL spectrum, as illustrated by block 370.1.*b*.

If the current subframe is a D2D subframe in DL spectrum (indicated by arrow 359.1), but it is not a D2D transmission opportunity according to the D2D scheduling pattern (indicated by arrow 361.1), the D2D-UEs may transmit cellular UL in UL spectrum and receive other D2D-UEs' signal in DL spectrum, as illustrated by block 358.1.*b*.

If current subframe is allocated for cellular transmission (indicated by arrow 362.1), the D2D-UE may perform cellular DL reception and cellular UL transmission, as illustrated by block 363.1.

Figure 8A:
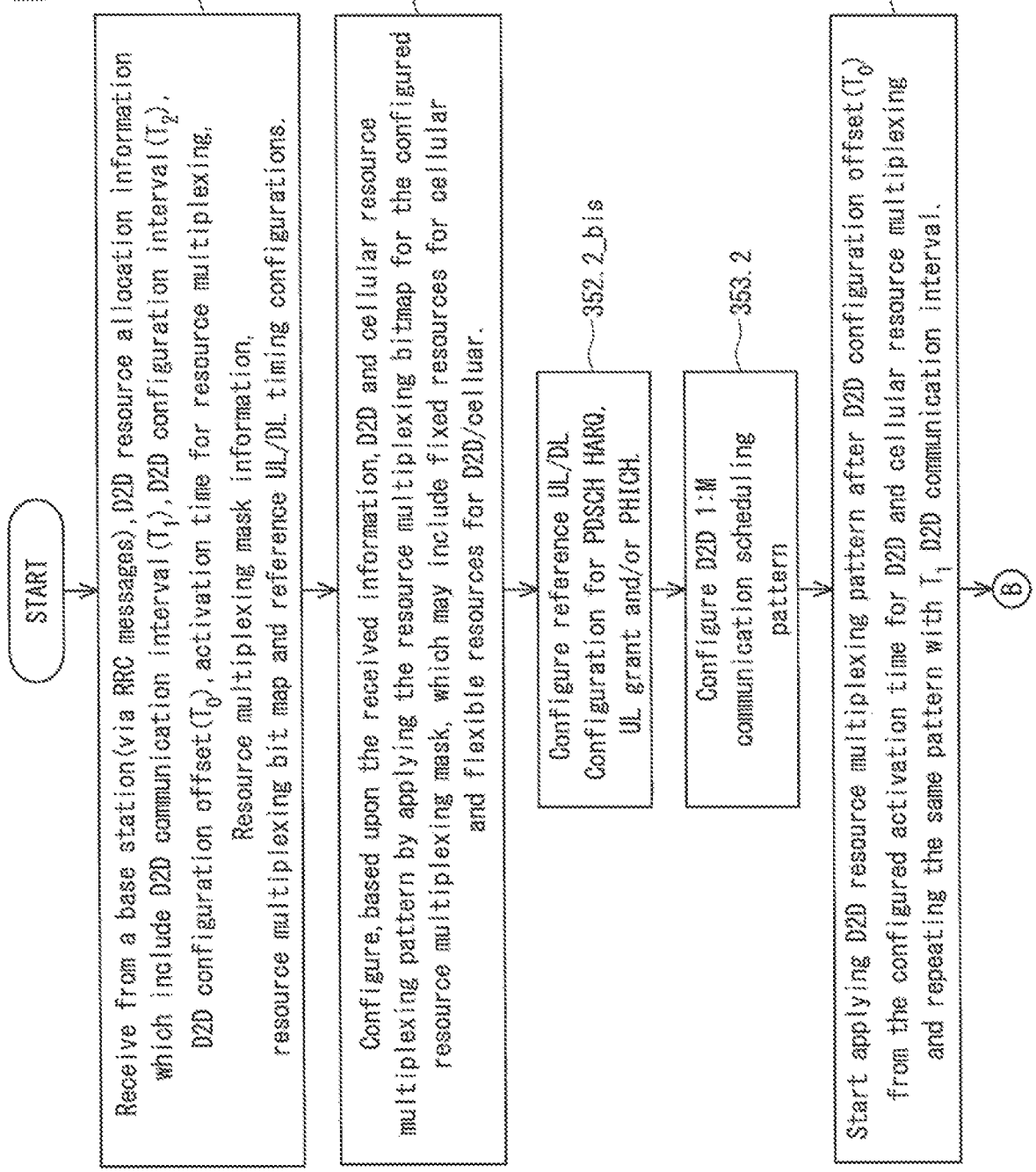
FIG. 8A illustrates a method for resource allocation or multiplexing for D2D and cellular at a UE in a TDD system, according to an embodiment of the present invention.
Figure 8B:
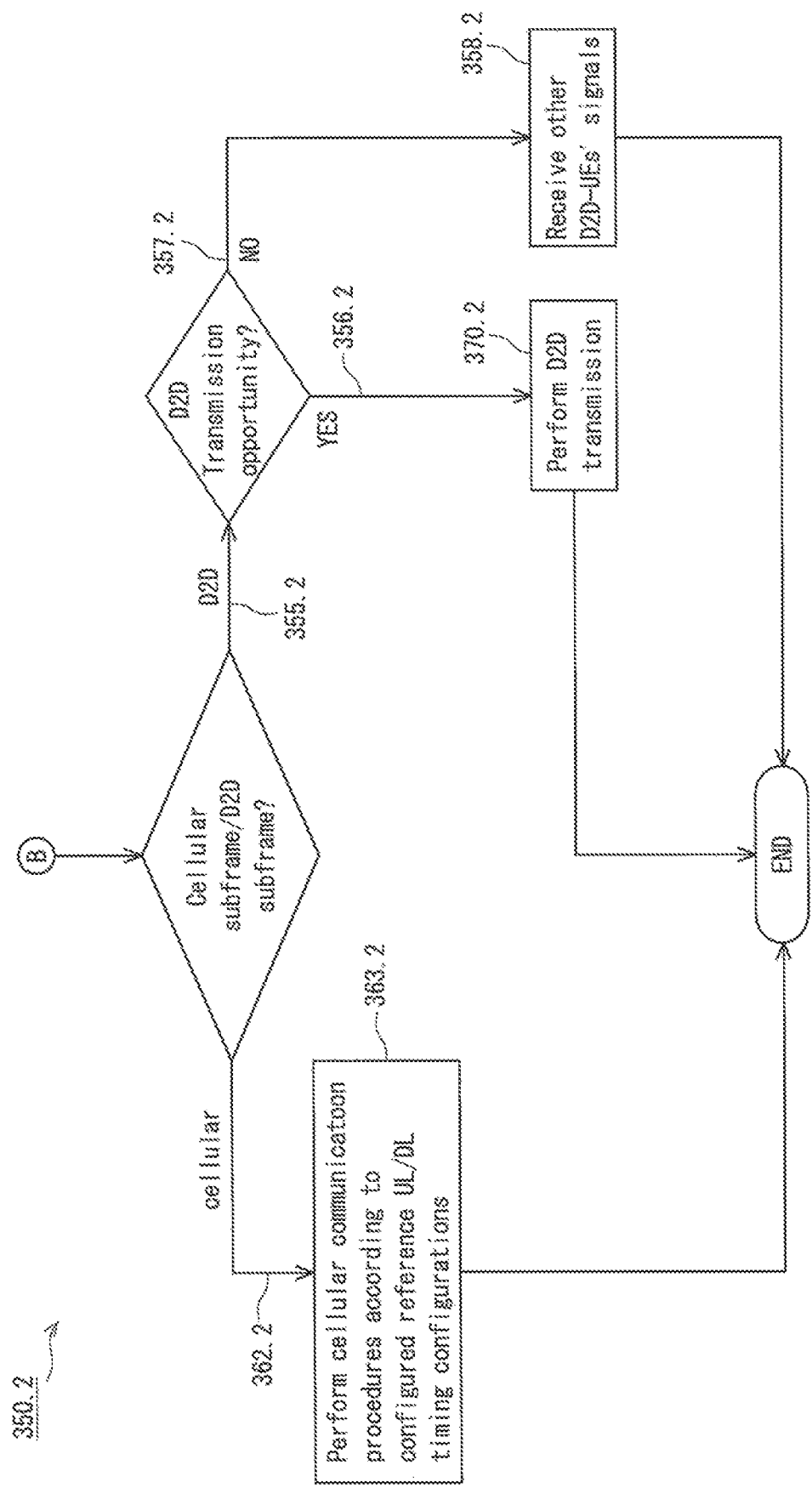
FIG. 8B illustrates a method for resource allocation or multiplexing for D2D and cellular at a UE in a TDD system, according to an embodiment of the present invention.

FIG. 8A and FIG. 8B illustrate a method 350.2 for resource allocation or multiplexing for D2D and cellular at a UE in a TDD system, according to an embodiment of the present invention.

At block 351.2, D2D resource allocation information is received from the base station 101, preferably via RRC messages. The D2D resource allocation information can include a D2D communication interval, a D2D configuration interval, a D2D configuration offset, resource multiplexing mask information, an activation time for resource multiplexing, a resource multiplexing bitmap, and reference UL/DL timing configurations for PDSCH HARQ-ACK, UL grant and/or PHICH. If the activation time is not configured, the D2D-UE will apply the configuration from the next coming radio frame.

Based upon received information, a D2D-UE can configure a D2D and cellular resource multiplexing pattern by applying the resource multiplexing bitmap for the configured resource multiplexing mask, at block 352.2. The D2D and cellular resource multiplexing pattern can include fixed resources for cellular communication and flexible resources for D2D or cellular communication.

At block 352.2_*bis*, reference UL/DL configuration(s) for PDSCH HARQ-ACK, UL grant and/or PHICH may be configured for cellular communication during the D2D communication interval $T_1$.

Next, at block 353.2 a D2D scheduling pattern may be configured, which indicates the order of transmission for D2D-UEs. It should be understood that the procedures presented in blocks 352.2, 352.2_*bis* and 353.2 may be executed by the D2D-UEs in the same order or in a different order.

Upon configuring the resource allocation patterns for D2D and cellular communications, the D2D-UEs, at block 354.2, may start applying the D2D resource multiplexing pattern after the D2D configuration offset from the configured activation time for the D2D communication interval, and repeating the same pattern with the D2D communication interval. After starting D2D and cellular resource multiplexing, the D2D-UEs may perform following operations at each subframe within the D2D communication interval:

If the current subframe is a D2D subframe (indicated by arrow 355.2), and it is a transmission opportunity according to the D2D scheduling pattern (indicated by arrow 356.2), the D2D-UE may perform D2D transmission, as indicated by block 370.2.

If the current subframe is a D2D subframe (indicated by arrow 355.2), but it is not a D2D transmission opportunity (indicated by arrow 357.2), the D2D-UEs may receive other D2D-UEs' signals, as indicated by block 358.2.

If the current subframe is allocated for cellular communication (indicated by arrow 362.2), the D2D-UE may perform cellular communication, as indicated by block 363.2.

FIG. 9 illustrates a schematic 400 of an exemplary cellular communication scenario, according to an embodiment of the present invention. The schematic 400 illustrates procedures for cellular communication at a base station, such as base station 101, D2D-UEs, such as D2D-UEs 102, 103, 104, and a legacy UE, such as UE 105, in an FDD system when cellular UL resources are shared by D2D-UEs for D2D communication.

The scenario is described with reference to a D2D group comprising a first D2D-UE A 102, a second D2D-UE B 103 and a third D2D-UE C 104, a base station 101, and a legacy UE 105. The D2D group has been allocated three UL subframes per FDD radio frame for D2D communication using either a first resource multiplexing mask with bitmap '00011111' or a second resource multiplexing mask with bitmap '000111'.

The scenario 400 may start at SF #0 of radio frame n, at which the base station 101 transmits a UL grant indicator 401 to D2D-UE A 102 in the DL. The D2D-UE A (102) then transmits UL data 402, corresponding to the UL grant 401, at UL SF #4 of the same radio frame. The UL data 402 is acknowledged by the base station 101 with a NAK in PHICH 403 at DL SF #8 of the same radio frame.

According to the current LTE FDD HARQ-ACK timing in UL, the D2D-UE A 102 should re-transmit its previous data in UL SF #2 404.*a* of radio frame (n+1). However, this UL SF #2 has been allocated for D2D communication for D2D-UE A 102, therefore, D2D-UE A 102 may wait until the next available UL cellular subframe at SF #4 of radio frame (n+1) to perform a re-transmission 404.

Corresponding to the re-transmission 404, the base station 101 may transmit an ACK in PHICH 405 at DL SF #8 of radio frame (n+1). The base station 101 then transmits a UL grant 406 to D2D-UE C 104 in DL SF #1 of radio frame n, which aligns with the first D2D opportunity of D2D-UE C 104 in the UL spectrum. Corresponding to the UL grant 406, the D2D-UE C 104 may perform the UL data transmission 407 at UL SF #5 of the same radio frame, and the base station 101 may send a NAK in PHICH 408 of DL SF #9 of the same radio frame.

Corresponding to the NAK 408, the D2D-UE C 104 should perform the re-transmission at UL SF #3 409.*a* of radio frame (n+1). However, this UL SF #3 has been allocated for D2D communication for the same D2D-UE C 104, therefore, the re-transmission 409 may be delayed until the next available UL cellular SF, which occurs at SF #4 of radio frame (n+1), and the base station (101) may send an ACK in PHICH (410) at DL SF #8 of radio frame (n+1).

A DL data transmission 411 to the D2D-UE B 103 from base station 101 is sent at DL SF #2 of radio frame n, which aligns with the UL SF #2 of the same radio frame allocated for D2D transmission for the D2D-UE B 103. D2D-UE B 103 acknowledges this DL data 411 at UL SF #6 of the same radio frame with an ACK 412.

Next, in DL SF #7 of radio frame n, the base station may transmit DL data 413 to the legacy UE 105, which then may send a NAK 414 to the base station at UL SF #2 of radio frame (n+1) that has been used for D2D transmission within the D2D group 102.*a*. Corresponding to the NAK 414, the base station 101 may schedule a re-transmission 415 at DL SF #8 of the radio frame (n+1). The legacy UE may send an ACK 416 for the said re-transmission 415 in the UL SF #2 of radio frame (n+1), which has also been used for D2D communication within the D2D group.

Finally, another UL grant 417 for D2D-UE B (103) is sent at DL SF #7 of radio frame (n+1). Corresponding to the said UL grant 417, the D2D-UE B 103 should send the UL data at UL SF #1 (418.*a*) of radio frame (n+2). Since this UL SF #1 has been allocated for D2D communication for the same D2D-UE 103, the UL data transmission may be delayed until the next cellular UL SF #4 of the radio frame (n+2).

Figure 10:
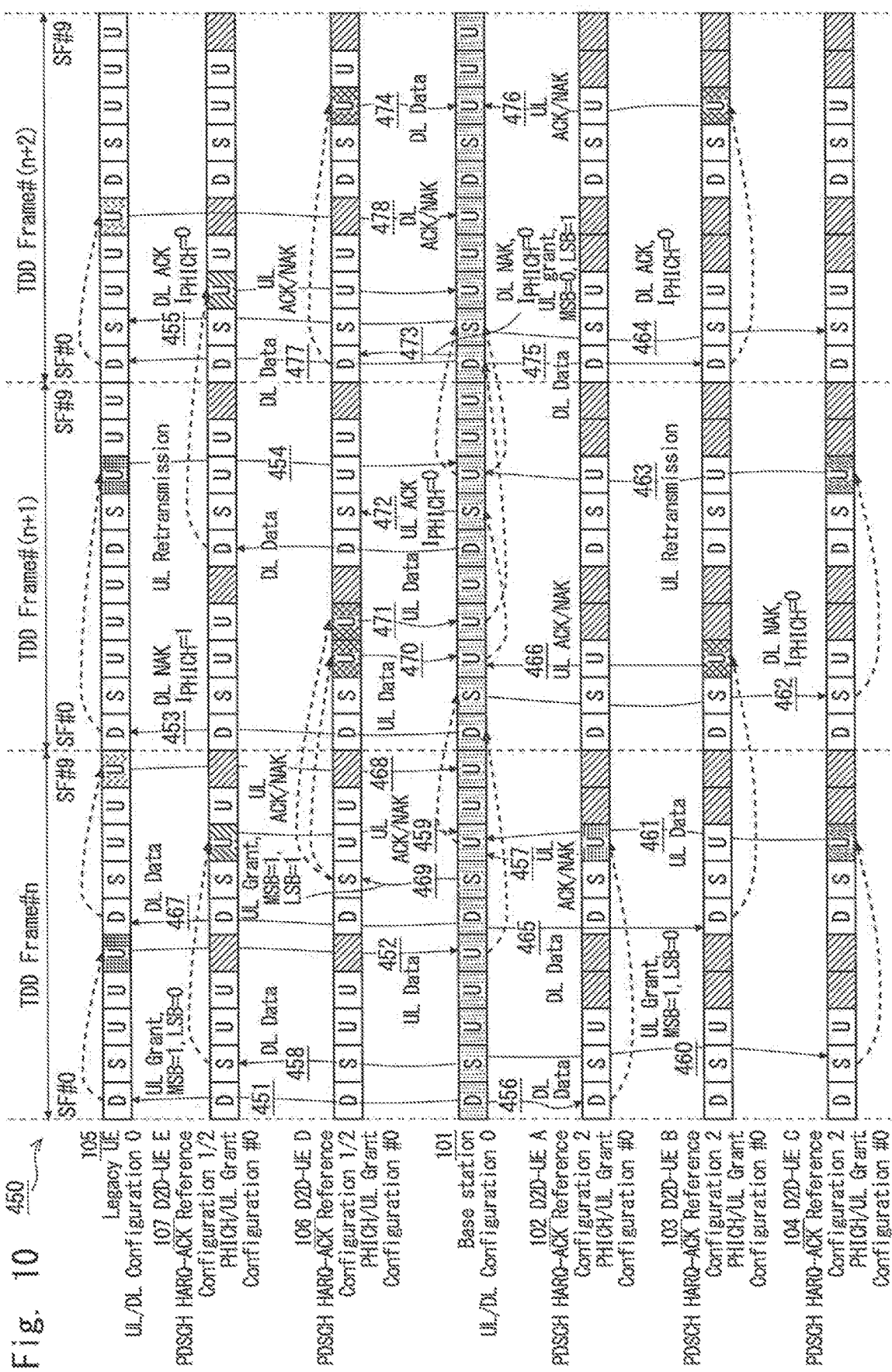
FIG. 10 illustrates a schematic illustrating the procedures for cellular communication at base station, D2D-UEs and legacy UE in TDD system when cellular resources are shared by D2D-UEs for D2D communication, according to an embodiment of the present invention.

FIG. 10 illustrates a schematic 450 illustrating the procedures for cellular communication at a base station, D2D-UEs, and a legacy UE in a TDD system when cellular resources are shared by D2D-UEs for D2D communication, according to an embodiment of the present invention.

The base station can be similar or identical to the base station 101 of FIG. 1, the D2D-UEs can be similar to the UEs 102, 103, 104, 106, and 107 of FIG. 1, and the legacy UE can be similar to the legacy UE 105 of FIG. 1.

The base station, which uses TDD UL/DL configuration 0, communicates with a D2D group 102.*a* comprised of D2D-UE A (also denoted as 102), D2D-UE B (also denoted as 103) and D2D-UE C (also denoted as 104), a one-to-one communication pair (106.*a*) comprised of D2D-UE D (also denoted as 106) and D2D-UE E (also denoted as 107), and a legacy UE (also denoted as 105). The D2D group 102.*a* has been allocated four UL subframes per TDD radio frame for D2D communication using a resource multiplexing mask with either a bitmap of '0011100' or with bitmap '00100'. The D2D pair (106 and 107) have been allocated two UL subframes per TDD radio frame for one-to-one communication 106.*a* using a resource multiplexing mask either with bitmap of '1011110' or bitmap '10110'.

The base station 101 may configure the D2D group 102.*a* with reference timing configuration for PDSCH HARQ-ACK transmission in UL as UL/DL configuration 2 while timing configuration for UL grant and PHICH transmission in DL may remain same as UL/DL configuration 0. The base station may also configure D2D pair (106 and 107) involved in one-to-one communication with reference timing configuration for PDSCH HARQ-ACK transmission in UL as UL/DL configuration 1 while timing configuration for UL grant and PHICH transmission in DL may remain same as UL/DL configuration 0.

The cellular communication scenario in 450 may start at SF #0 of the nth radio frame at which the base station 101 may transmit a UL grant with MSB=1 and LSB=0 (as depicted in 451) to the legacy UE 105 while it may also transmit DL data (depicted by 456) to the D2D-UE-A 102 in D2D group 102.*a*. Corresponding to the UL grant 451 transmitted to the legacy UE 105, the legacy UE 105 may transmit UL data 452 on SF #4 of radio frame n, which has been allocated for D2D communication in D2D group 102.*a* and D2D pair (106 and 107), to the base station 101. The base station may then send a NAK in PHICH with $I_{PCHICH}=1$ (depicted by 453) to the legacy UE 105 at SF #0 of radio frame (n+1) according to the UL grant and PHICH timing of UL/DL configuration 0.

Upon reception of NAK (453) the legacy UE 105 may re-transmit its UL data (depicted by 454) at SF #7 of radio frame (n+1) to the base station 101, which then may send ACK in PHICH with $I_{PHICH}=0$ (depicted by 455) to the legacy UE 105 according to the PHICH timing of UL/DL configuration 0. With respect to the DL data (depicted by 456) transmitted to the D2D-UE A 102 on DL SF #0 of radio frame n, D2D-UE A 102 may send ACK/NAK on SF #7 of the same radio frame to the base station 101 according to the UL/DL configuration 2 which is the reference timing configuration for PDSCH HARQ-ACK transmission in D2D group 102.*a*.

The base station 101 may then transmit DL data (depicted by 458) to D2D-UE E 107 of the one-to-one communication pair 106.*a* and a UL grant with MSB=1 and LSB=0 (depicted by 460) to D2D-UE C 104 of the D2D group 102.*a* simultaneously in the DL part of the SF #1 of radio frame n. With respect to the DL data (depicted by 458) the D2D-UE E 107 may transmit an ACK/NAK message 459 to the base station 101 at SF #7 of the same radio frame according to the UL/DL configuration 1 which is the reference timing configuration for PDSCH HARQ-ACK transmission in the one-to-one communication group 106.*a*. Meanwhile, in response to the UL grant (depicted by 460), D2D-UE C 104 may transmit its UL data 461 in SF #7 of the same radio frame, according to the UL grant timing of UL/DL configuration 0, to the base station 101 which then may send a NAK in PHICH with $I_{PHICH}=0$ (depicted by 462) to the D2D-UE C 104 in the DL part of the SF #1 of radio frame (n+1). Upon reception of the NAK 462, the D2D-UE C 104 may re-transmit UL data (depicted by 463) in SF #7 of the radio frame (n+1) to the base station 101, which may then send am ACK in PHICH with $I_{PHICH}=0$ (depicted by 464) to D2D-UE C 104 in the DL part of the SF #1 of radio frame (n+2) according to the PHICH and re-transmission timing rules of UL/DL configuration 0.

At the DL SF #5 of radio frame n, the base station 101 may send DL data (depicted by 465) to D2D-UE B 103 of D2D group 102.a and DL data (depicted by 467) to the legacy UE 105 simultaneously. These DL transmission may be acknowledged by D2D-UE B 103 in SF #2 of radio frame (n+1) at 466 according to reference PDSCH HARQ-ACK timing of UL/DL configuration 2, and by the legacy UE 105 in SF #9 of radio frame n 468, which has been allocated for D2D communication in D2D group 102.a and one-to-one communication pair 106.a, according to PDSCH HARQ-ACK timing of UL/DL configuration 0.

In the exemplary scenario 450, the base station 101 may transmit a UL grant with MSB=1 and LSB=1 (depicted by 469) to the D2D-UE D 106 in the DL part of the SF #6 of radio frame n. This UL grant may trigger UL transmissions by D2D-UE D 106 at SF #2 (depicted by 470) and SF #3 (depicted by 471) of radio frame (n+1) according to UL grant timing of UL/DL configuration 0. The base station 101 may send an ACK on PHICH with $I_{PHICH}=0$ (depicted by 472) corresponding to the UL data 470 in SF #6 of radio frame (n+1) while it may send a NAK on PHICH with $I_{PHICH}=0$ (depicted by 473) on DL SF #0 of radio frame (n+2) according to the PHICH timing of UL/DL configuration 0. In response to the NAK received in SF #0 of radio frame (n+2) D2D-UE D 106 should re-transmit its UL data (depicted by 471) in SF #4 of radio frame (n+1) according to PHICH assignment and re-transmission timing of UL/DL configuration 0. However, this UL SF #4 has been allocated for D2D communication at D2D-UE D 106, which results in a D2D and PUSCH collision. In order to resolve this issue, the base station 101 may also send a UL grant with MSB=0 and LSB=1 (depicted by 473) at SF #0 of radio frame (n+2) to re-configure the UL re-transmission to SF #7 of radio frame (n+2). Based upon the UL grant in 473, D2D-UE D 106 may perform the re-transmission (depicted by 474) at SF #7 of radio frame (n+2).

In SF #0 of radio frame (n+2), the base station 101 may also schedule DL data for D2D-UE B 103 at 475 and the legacy UE 105 at 477. These transmissions will be acknowledged by D2D-UE B 103 in SF #7 (depicted by 476) of the same radio frame according the PDSCH HARQ-ACK reference timing of UL/DL configuration 2, and by the legacy UE 105 in SF #4 (depicted by 477), which has been allocated for D2D communication in D2D group 102.a and one-to-one pair 106.a, according to the PDSCH HARQ-ACK timing of UL/DL configuration 0.

Figure 11:
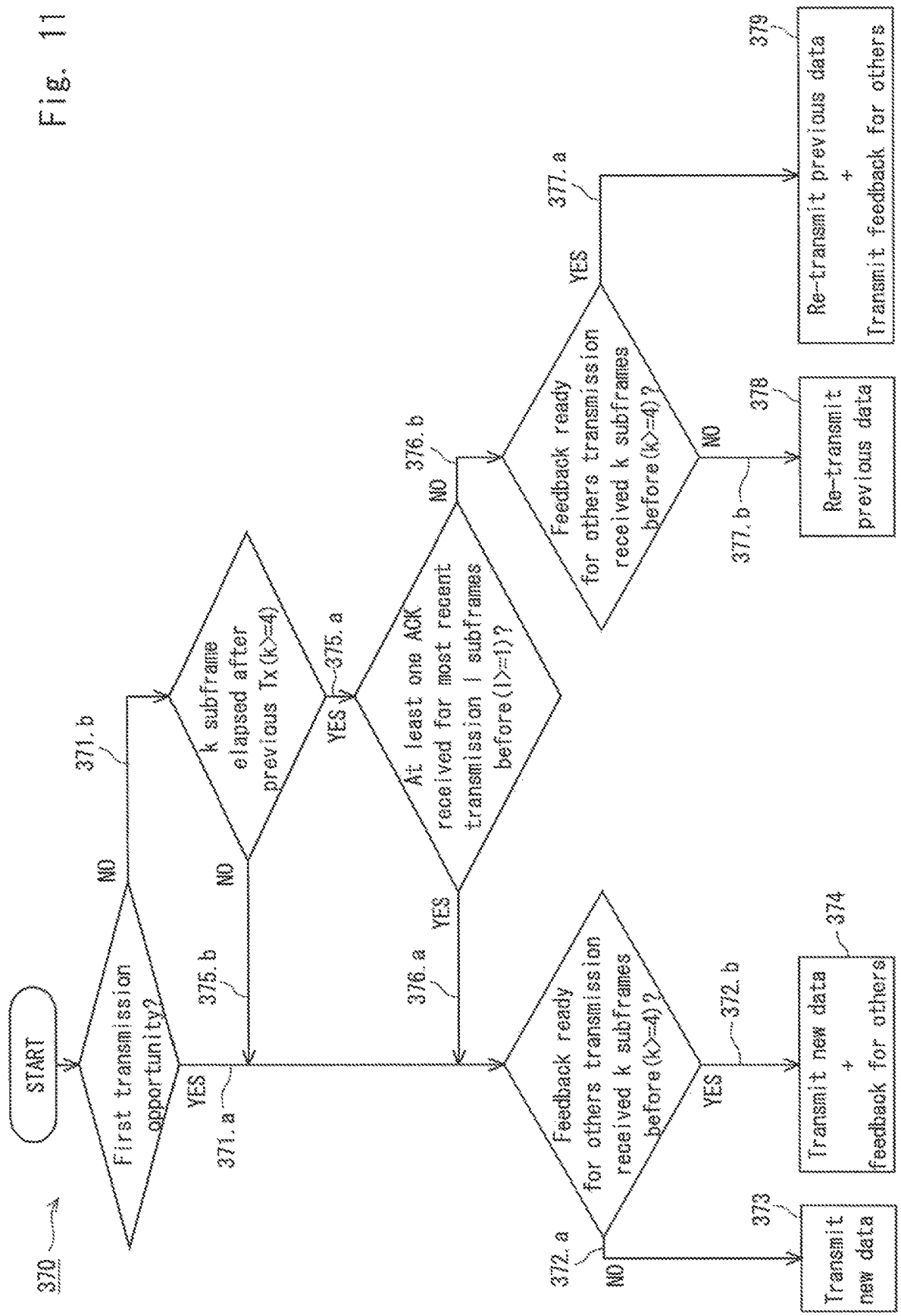
FIG. 11 illustrates a method of performing D2D communication within a group of D2D UEs in resources allocated for D2D communication, according to an embodiment of the present invention.

FIG. 11 illustrates a method 370 of performing D2D communication within a group of D2D UEs in resources allocated for D2D communication, according to an embodiment of the present invention.

The method 370 may be applied to D2D-UEs in a D2D group (such as 102.a) that has already received D2D resource allocation information from the base station 101 preferably in the form of resource allocation mask information as described earlier. Within the said D2D group, there may be a group owner/master who decides the scheduling pattern for the D2D-UEs within the group depending on the buffer status and the priorities of each member of the group and transmits the pattern to the group. The scheduling pattern may be a sequence that shows who should transmit next in the D2D resources. The scheduling pattern may be repeatedly applied by the D2D-UEs in the group to determine which UE should transmit in each D2D resource.

According to certain embodiments, A D2D-UE in the group may send ACK/NAK feedback for other transmissions piggybacked with its own data transmission during the transmission opportunity assigned for the said D2D-UE.

The method 370 is based on a set of rules as described below.

According to certain embodiments, a D2D-UE in the D2D group transmits one or multiple ACK/NAK feedback messages, addressed to one or more other D2D-UEs in the group, piggybacked with its own data transmission in their respective transmission opportunities. The one or multiple feedback messages may contain an ACK/NAK for most recently received 'non-expired data' from each D2D-UE in the said D2D group. Here, 'non-expired data' refers to data received from another D2D-UE in the group for which the other D2D-UE has not yet received a re-transmission or new transmission opportunity.

A D2D-UE that performs a D2D transmission on subframe n may expect feedback for its transmission on or after subframe n+k. Preferably k=4.

Upon receiving feedback from another D2D-UE in the group on subframe n, a D2D-UE may apply the received feedback on its next scheduled transmission on or after subframe n+l where $l>=1$.

According to certain embodiments of the present invention, a D2D-UE may perform re-transmission if all received feedback until its next transmission opportunity are NAKs or if no feedback is received until its next transmission opportunity. In other words, a D2D-UE in the D2D group may not re-transmit if at least one positive acknowledgement is received before its next scheduled transmission opportunity.

The method 370 may be used by a D2D-UE (e.g. 102 or 103 or 104) that is given an opportunity to transmit in the D2D group. In such case, the following operations are be performed by a D2D-UE (102, 103, 104) on the given transmission opportunity.

If the current transmission opportunity is the first transmission opportunity (as depicted by arrow 371.a), and if there is no ACK/NAK feedback ready for others transmission received k subframes before (as depicted by arrow 372.a), where $k>=4$, the D2D-UE (102 or 103 or 104) may transmit new data only (as depicted by block 373).

If the current transmission opportunity is the first transmission opportunity (as depicted by arrow 371.a), and there is ACK/NAK feedback ready for others transmission received k subframes before (as depicted by arrow 372.b), where $k>=4$, the D2D-UE (102 or 103 or 104) may transmit new data and ACK/NAK feedback together (as depicted by block 374). As described earlier, this ACK/NAK feedback transmission may be piggybacked with data transmission.

If the current transmission opportunity is not the first transmission opportunity (as depicted by arrow 371.b), and if k subframes have elapsed after its previous transmission (as depicted by arrow 375.a), and if at least one ACK received l subframes before (as depicted by arrow 376.a) for its most recent transmission, where $l>=1$, and if there is no ACK/NAK feedback corresponding to others' transmission received k subframes before (as depicted by arrow 372.a) ready, where $k>=4$, the D2D-UE (102 or 103 or 104) may transmit new data only (as depicted by block 373).

If the current transmission opportunity is not the first transmission opportunity (as depicted by arrow 371.b), and if k subframes have elapsed after its previous transmission (as depicted by arrow 375.*a*), and if at least one ACK received 1 subframes before for its most recent transmission (as depicted by arrow 376.*a*), where l>=1, and if there is ACK/NAK feedback corresponding to others' transmission received k subframes before, ready (as depicted by arrow 372.*b*), where k>=4, the D2D-UE (102 or 103 or 104) may transmit its new data and ACK/NAK feedback together (as depicted by block 374). As described above, this ACK/NAK feedback transmission may be piggybacked with data transmission.

If the current transmission opportunity is not the first transmission opportunity (as depicted by arrow 371.*b*), and if k subframes have elapsed after its previous transmission (as depicted by arrow 375.*a*), and if there is no ACK received for its most recent transmission, 1 subframes before (376.*b*), where l>=1, and if there is ACK/NAK feedback corresponding to others transmission received k subframes before, ready (as depicted by arrow 377.*a*), where k>=4, the D2D-UE (102 or 103 or 104) may re-transmit its most recently transmitted data together with ACK/NAK feedback (as depicted by block 379). As described above, this ACK/NAK feedback transmission may be piggybacked with data transmission.

If the current transmission opportunity is not the first transmission opportunity (as depicted by arrow 371.*b*), and if k subframes have elapsed after its previous transmission (as depicted by arrow 375.*a*), and if there is no ACK received for its most recent transmission, 1 subframes before (376.*b*), where l>=1, and if there is no ACK/NAK feedback ready for others transmission received k subframes before (as depicted by arrow 377.*b*), where k>=4, the D2D-UE (102 or 103 or 104) may re-transmit most recently transmitted data only (as depicted by block 378).

If the current transmission opportunity is not the first transmission opportunity (as depicted by arrow 371.*b*), and if k subframes have not elapsed after its previous transmission (as depicted by arrow 375.*b*), and if there is no ACK/NAK feedback corresponding to others transmission received k subframes before, ready (as depicted by arrow 372.*a*), where k>=4, the D2D-UE (102 or 103 or 104) may transmit its new data only (as depicted by block 373).

If the current transmission opportunity is not the first transmission opportunity (as depicted by arrow 371.*b*), and if k subframes have not elapsed after its previous transmission (as depicted by arrow 375.*b*), and if there is ACK/NAK feedback corresponding to others transmission received k subframes before, ready (as depicted by arrow 372.*b*), where k>=4, the D2D-UE (102 or 103 or 104) may transmit its new data and ACK/NAK feedback together (as depicted by block 374). As described above, this ACK/NAK feedback transmission may be piggybacked with data transmission.

Figure 12:
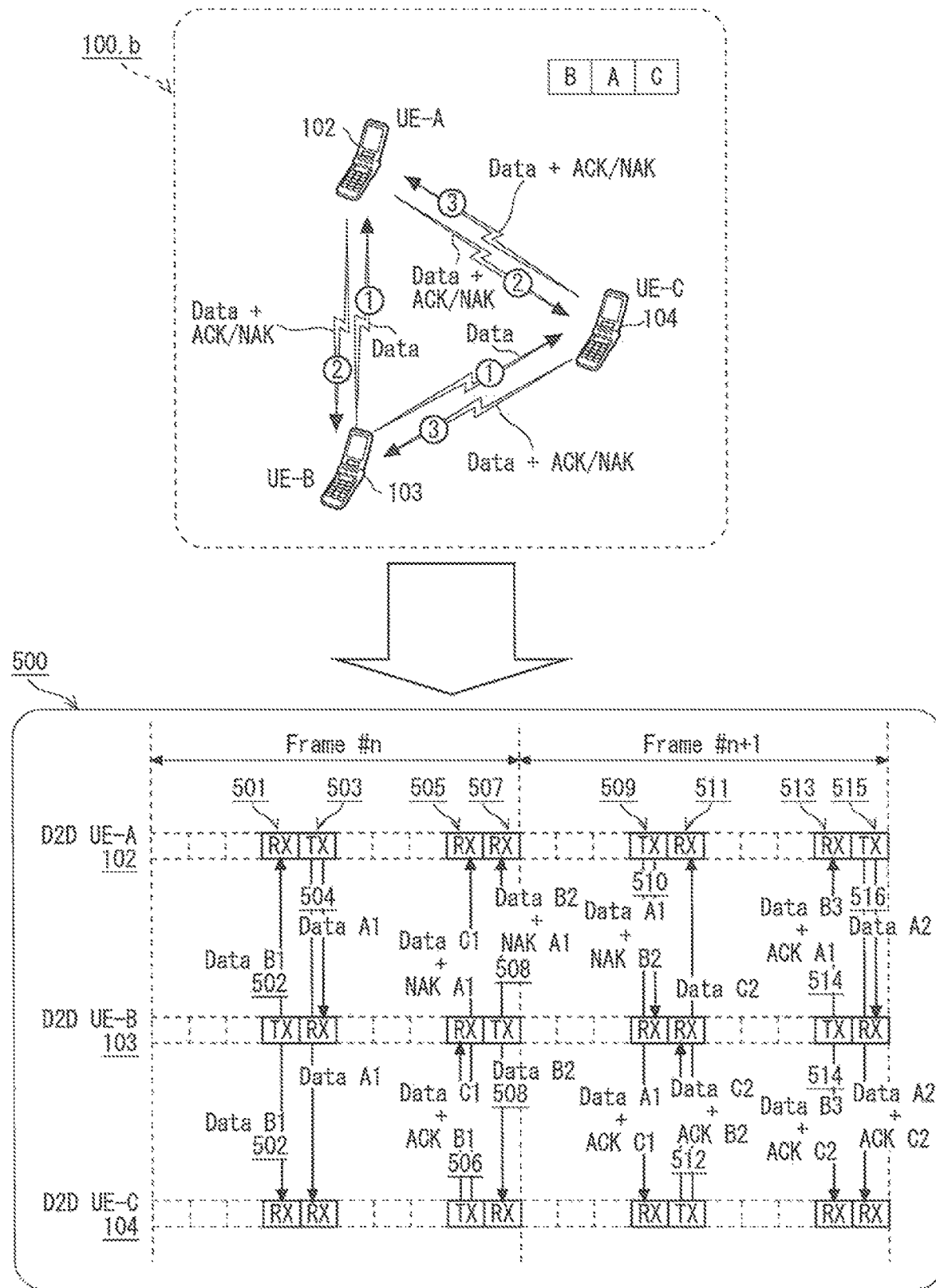
FIG. 12 illustrates a schematic of an exemplary D2D communication scenario in a D2D group, and a schematic illustrating a corresponding timing diagram, according to an embodiment of the present invention.

FIG. 12 illustrates a schematic 100.*b* of an exemplary D2D communication scenario in a D2D group such as 102.*a*, and a schematic 500 illustrating a corresponding timing diagram, according to an embodiment of the present invention.

In the exemplary scenario 100.*b*, three D2D UEs, namely UE-A 102, UE-B 103 and UE-C 104 communicate with each other according to the scheduling pattern 'BAC' which indicates that D2D-UE B 103 will transmit first followed by D2D-UE A 102 and then D2D-UE C 104. Furthermore, the D2D-UEs have been allocated four subframes per radio frame for D2D communication, preferably using one of the earlier described resource multiplexing masks described in accordance with one novel aspect of the present invention.

Accordingly, at the first D2D communication opportunity (as depicted by 501), the D2D-UE B 103 will transmit data B1 (depicted by 502) for the first time to D2D-UE A 102 and D2D-UE C 104. Next, at the second D2D communication opportunity (depicted by 503), which occurs immediately after the first communication opportunity 501, the D2D-UE A 102 will transmit data A1 (depicted by 504) for the first time. At the occurrence of this opportunity (503), D2D-UE A 102 may not have completed processing the data received from D2D-UE B 103, therefore, the ACK/NAK for that data (502) is not ready for transmission by D2D-UE A 102.

As illustrated, a third D2D opportunity (depicted by 505) occurs three subframes after the second opportunity (503). At this third opportunity (505), D2D-UE C 104 transmits its data C1 together with any feedback ready for other UEs. Since the third D2D opportunity (505) occurs four or more subframes after previous two transmissions, ACK/NAK feedback for those transmissions (502 and 504) may be ready at D2D-UE C 104. Thus, D2D-UE C 104 transmits its data C1 along with NAK for A1 and ACK for B1 at 506. At a fourth D2D opportunity (depicted by 507), which occurs immediately after the third opportunity (505), D2D-UE B 103 again gets the opportunity to transmit. By this time it has feedback ready for data A1 (504), but not for data C1 (506). Further, assuming that a D2D-UE can apply feedback one subframe after receiving the feedback (i.e. l=1), D2D-UE B 103 has received one ACK from D2D-UE C 104 at 506 for its previous transmission B1 (502). Therefore, D2D-UE B 103 will transmit new data B2 along with NAK for A1 at 508.

A fifth D2D opportunity (509) occurs at the fourth subframe after the fourth opportunity (507), and the D2D-UE A 102 gets a turn to transmit. At this stage, D2D-UE A has received two feedbacks from D2D-UE B 103 and D2D-UE C 104 for its previous transmission A1 (504), and both of them are NAK. Therefore, D2D-UE A 102 re-transmits its previous data A1 at the fifth D2D opportunity (509). Further, D2D-UE A 102 has feedback ready for data B1, B2 and C1 received after its previous transmission. However, D2D-UE B 103 has already completed the transmission cycle for data B1 because it has already transmitted data B2 based on the feedback for data B1. Therefore, at the fifth D2D opportunity (509), data B1 has 'expired'. Thus, D2D-UE A 102 may not transmit feedback for data B1, but for data B2 and C1. As a result, D2D-UE A 102 may transmit data A1 along with NAK for data B2 and ACK for data C1 (depicted by 510).

Next, at a sixth D2D opportunity (depicted by 511), D2D-UE C 104 gets a second turn to transmit. At this point, D2D-UE C 104 has received one ACK from D2D-UE A 102 for its previous data C1. Therefore, D2D-UE C may transmit new data C2. Further, D2D-UE C 104 has feedback ready for data B2 among the transmissions received after its previous transmission opportunity (505). Thus, D2D-UE C 104 may transmit data C2 along with ACK for B2 (depicted by 512). A seventh D2D opportunity (depicted by 513) occurs at the fourth subframe after the sixth opportunity (511), and D2D-UE B 103 gets its third opportunity to transmit. According to the previously described rules, D2D-UE B 103 transmits new data B3 along with ACK for A1 and ACK for C2 (depicted by 514). The final D2D opportunity (depicted by 515) occurs at the last subframe of the frame (n+1), at which point D2D-UE A 102 transmits new data A2 and ACK for C2 (516).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2014901540, filed on Apr. 29, 2014, the disclosure of which is incorporated herein in its entirety by reference.

REFERENCE SIGNS LIST 100 wireless communication system
101 access node
101.a first coverage
102-107 user equipment (UE)
102.a D2D group
106.a D2D-pair

The invention claimed is:

1. A wireless communications method implemented in a base station used in a wireless communications system supporting cellular communications, the wireless communications method comprising:
   transmitting, to a user equipment, first information, second information and third information, the first information indicating a communication interval, the second information indicating a configuration offset, and the third information indicating a resource allocation, wherein the resource allocation starts after the configuration offset which is relative to subframe 0; and
   communicating the user equipment on resources determined based on the first information, the second information and the third information.

2. The wireless communications method as in claim 1, wherein the third information comprises a subframe bitmap indicating resources used for the D2D communications.

3. The wireless communications method as in claim 2, wherein the subframe bitmap indicates a resource allocation pattern for the D2D communications.

4. The wireless communications method as in claim 2, wherein each bit of the subframe bitmap indicates whether a subframe is allocated to the cellular communications or the D2D communications.

5. The wireless communications method as in claim 2, wherein the communication interval is a period over which the resources for the D2D communications are allocated, and the configuration offset defines an offset of the first configuration interval with respect to the communication interval.

6. The wireless communications method as in claim 2, wherein the communication interval is counted by the radio frame.

7. The wireless communications method as in claim 2, wherein values of the communication interval comprise four, eight, sixteen, and thirty-two radio frames.

8. The wireless communications method as in claim 1, wherein the first information, the second information and the third information are included in an RRC message.

9. A wireless communications method implemented in a user equipment used in a wireless communications system supporting cellular and device-to-device (D2D) communications, the wireless communications method comprising:
   receiving, from a base station, first information, second information and third information, the first information indicating a communication interval, the second information indicating a configuration offset, and the third information indicating a resource allocation, wherein the resource allocation starts after the configuration offset which is relative to subframe 0; and
   communicating other D2D user equipment on resources determined based on the first information, the second information and the third information.

10. The wireless communications method as in claim 9, wherein the third information comprises a subframe bitmap indicating resources used for the D2D communications.

11. The wireless communications method as in claim 10, wherein the subframe bitmap indicates a resource allocation pattern for the D2D communications.

12. The wireless communications method as in claim 10, wherein each bit of the subframe bitmap indicates whether a subframe is allocated to the cellular communications or the D2D communications.

13. The wireless communications method as in claim 10, wherein the communication interval is a period over which the resources for the D2D communications are allocated, and the configuration offset defines an offset of the first configuration interval with respect to the communication interval.

14. The wireless communications method as in claim 10, wherein the communication interval is counted by the radio frame.

15. The wireless communications method as in claim 10, wherein values of the communication interval comprise four, eight, sixteen, and thirty-two radio frames.

16. The wireless communications method as in claim 9, wherein the first information, the second information and the third information are included in an RRC message.

* * * * *